(12) United States Patent
Svore et al.

(10) Patent No.: US 9,779,359 B2
(45) Date of Patent: Oct. 3, 2017

(54) QUANTUM ARITHMETIC ON TWO-DIMENSIONAL QUANTUM ARCHITECTURES

(75) Inventors: Krysta M. Svore, Seattle, WA (US); Paul Tan The Pham, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1054 days.

(21) Appl. No.: 13/420,247

(22) Filed: Mar. 14, 2012

(65) Prior Publication Data
US 2013/0246495 A1      Sep. 19, 2013

(51) Int. Cl.
| G06N 99/00 | (2010.01) |
| B82Y 10/00 | (2011.01) |
| G06F 7/72 | (2006.01) |

(52) U.S. Cl.
CPC ............ *G06N 99/002* (2013.01); *B82Y 10/00* (2013.01); *G06F 7/72* (2013.01)

(58) Field of Classification Search
CPC ....... B82Y 10/00; G06N 99/002; G06F 7/723; G06F 7/727
See application file for complete search history.

(56) References Cited

U.S. PATENT DOCUMENTS

| 5,793,091 | A | 8/1998 | Devoe | |
| 6,098,088 | A * | 8/2000 | He | G06F 17/142 708/406 |
| 2011/0047201 | A1* | 2/2011 | Macready et al. | 708/446 |

OTHER PUBLICATIONS

P. Pham and K. Svore, "A 2D Nearest-Neighbor Quantum Architecture for Factoring in Polylogarithmic Depth", Quantum Information and Computation, vol. 13, No. 11&12, 2013.*
Mehdi Saeedi , Robert Wille , and Rolf Drechsler, "Synthesis of quantum circuits for linear nearest neighbor architectures", Quantum Information Processing, vol. 10, No. 3, pp. 355-377, 2011.*
MathIsFun.com, "Commutative, Associative and Distributive Laws", Jan. 2012, retrieved from https://web.archive.org/web/20120119102423/http://www.mathsisfun.com/associative-commutative-distributive.html.*
Wikipedia.org, "Qubit", Feb. 29 2012, retrieved from https://en.wikipedia.org/w/index.php?title=Qubit&oldid=479412867.*
Alireza Shafaei, Mehdi Saeedi, and Massoud Pedram, "Qubit placement to minimize the communication overhead in circuits mapped to 2D quantum architectures", In ASP Design Automation Conf., pp. 495-500, 2014.*
M. S. Islam, "A novel quantum cost efficient reversible full adder gate in nanotechnology," Hardware Architecture, Cornell University, Aug. 2010.*

(Continued)

*Primary Examiner* — Matthew Sandifer
(74) *Attorney, Agent, or Firm* — Klarquist Sparkman, LLP

(57) ABSTRACT

2D nearest-neighbor quantum architectures for Shor's factoring algorithm may be accomplished using the form of three arithmetic building blocks: modular addition using Gossett's carry-save addition, modular multiplication using Montgomery's method, and non-modular multiplication using an original method. These arithmetic building blocks may assume that ancillae are cheap, that concurrent control may be available and scalable, and that execution time may be the bottleneck. Thus, the arithmetic building blocks may be optimized in favor of circuit width to provide improved depth existing nearest-neighbor implementations.

6 Claims, 24 Drawing Sheets

(56) References Cited

OTHER PUBLICATIONS

Devitt, Simon John, "Quantum Information Engineering: Concepts to Quantum Technologies", Retrieved at <<http://web.mac.com/devitt1/Site/About_Me_files/conf-thesis-template.pdf>>, Proceedings of PhD Thesis, University of Melbourne, Victoria, Australia, Nov. 2007, pp. 289.

Hill, et al., "Operator Imprecision and Scaling of Shor's Algorithm", Retrieved at <<http://arxiv.org/ftp/arxiv/papers/0804/0804.3076.pdf>>, Proceedings of Quantum Physics (quant-ph), 2008, pp. 15.

Green, et al., "Shor in Haskell The Quantum IO Monad", Retrieved at <<http://www.cs.nott.ac.uk/~asg/pdfs/tfp08.pdf>>, Proceedings of Semantic Techniques in Quantum, Computation, Chapter 1. CUP, 2009, pp. 1-15.

Meter, et al., "Fast Quantum Modular Exponentiation", Retrieved at <<http://appi2.appi.keio.ac.jp/Itoh_group/publications/pdf/PhysRevA_71_052320.pdf>>, Proceedings of Physical Review. A vol. 71 issue 5, May 15, 2005, pp. 1-12.

Metodi, et al., "A Quantum Logic Array Microarchitecture: Scalable Quantum Data Movement and Computation", Retrieved at <<http://ieeexplore.ieee.org/stamp/stamp.jsp?tp=&arnumber=1540969>>, Proceedings of 38th Annual IEEE/ACM International Symposium on Microarchitecture (MICRO'05), Nov. 12-16, 2005, pp. 1-12.

Thaker, et al., "A Realizable Distributed Ion-Trap Quantum Computer", Retrieved at <<http://citeseerx.ist.psu.edu/viewdoc/download?doi=10.1.1.91.9154&rep=rep1&type=pdf>>, Proceedings of 12 th International Conference on High Performance Computing, Bangalore, Dec. 2006, pp. 111-122.

Zalka, Christof, "Shor's algorithm with fewer (pure) qubits", Retrieved at <<http://arxiv.org/PS_cache/quant-ph/pdf/0601/0601097v1.pdf>>, Feb. 1, 2008, pp. 1-12.

Beauregard, Stephane, "Circuit for Shor's algorithm using 2n+3 Qubits", Retrieved at <<http://arxiv.org/PS_cache/quant-ph/pdf/0205/0205095v1.pdf>>, May 2002, pp. 1-13.

Choi, et al., "$\Theta(\sqrt{2})$"-depth Quantum Adder on a 2D NTC Quantum Computer Architecture", Retrieved at <<http://arxiv.org/PS_cache/arxiv/pdf/1008/1008.5093v1.pdf>>, Aug. 2010, pp. 16.

Draper, Thomas, G., "Addition on a Quantum Computer", Retrieved at <<http://arxiv.org/PS_cache/quant-ph/pdf/0008/0008033v1.pdf>>, Aug. 2000, pp. 8.

Draper, et al., "A logarithmic-depth quantum carry-lookahead adder", Retrieved at <<http://research.microsoft.com/en-us/people/ksvore/logadder0406142v1.pdf>>, Jun. 2004, pp. 21.

Fowler, et al., "Implementation of Shor's Algorithm on a Linear Nearest Neighbour Qubit Array", Retrieved at <<http://arxiv.org/PS_cache/quant-ph/pdf/0402/0402196v1.pdf>>, Feb. 2004, pp. 9.

Gossett, Phil, "Quantum Carry-Save Arithmetic", Retrieved at <<http://citeseerx.ist.psu.edu/viewdoc/download?doi=10.1.1.205.6715&rep=rep1&type=pdf>>, Aug. 29, 1998, pp. 1-12.

Kutin, Samuel, A., "Shor's algorithm on a nearest-neighbor machine", Retrieved at <<http://www.citebase.org/fulltext?format=application%2Fpdf&identifier=oai%3AarXiv.org%3Aquant-ph%2F0609001>>, Aug. 2006, pp. 11.

Montgomery, Peter, L., "Modular multiplication without trial division", Retrieved at <<http://class.ee.iastate.edu/tyagi/cpre681/papers/Montgomery.pdf>>, Proceedings of Mathematics of Computation, vol. 44, No. 170, Apr. 1985, pp. 519-521.

Mosca, et al., "The Hidden Subgroup Problem and Eigenvalue Estimation on a Quantum Computer", Retrieved at<<http://citeseerx.ist.psu.edu/viewdoc/download?doi=10.1.1.31.5770&rep=rep1&type=pdf>>, Mar. 1999, pp. 16.

Takahashi, et al., "Quantum Addition Circuits and Unbounded Fan-Out", Retrieved at <<http://arxiv.org/PS_cache/arxiv/pdf/0910/0910.2530v1.pdf>>, Oct. 2009, pp. 17.

Meter, III, Rodney Doyle Van., "Architecture of a Quantum Multicomputer Optimized for Shors Factoring Algorithm", .2008, pp. 256.

Vedral., "Quantum networks for elementary arithmetic operations", Retrieved at <<http://www.cs.nott.ac.uk/~asg/NSC/arithmetic.pdf>>, Physical Review A, vol. 54, No. 1, Jul. 1996, pp. 147-153.

Wallace, C.S., "A Suggestion for a Fast Multiplier"., Proceedings of IEEE Transactions on Electronic Computers, EC-13(1), Feb. 1964, pp. 14-17.

Zalka, Christof, "Fast versions of Shor s quantum factoring algorithm", Retrieved at <<http://citeseer.ist.psu.edu/viewdoc/download;jsessionid=2A5CBF94A6CB182B3626CD66E2067169?doi=10.1.1.41.8328&rep=rep1&type=pdf>>, 1998, pp. 1-37.

\* cited by examiner

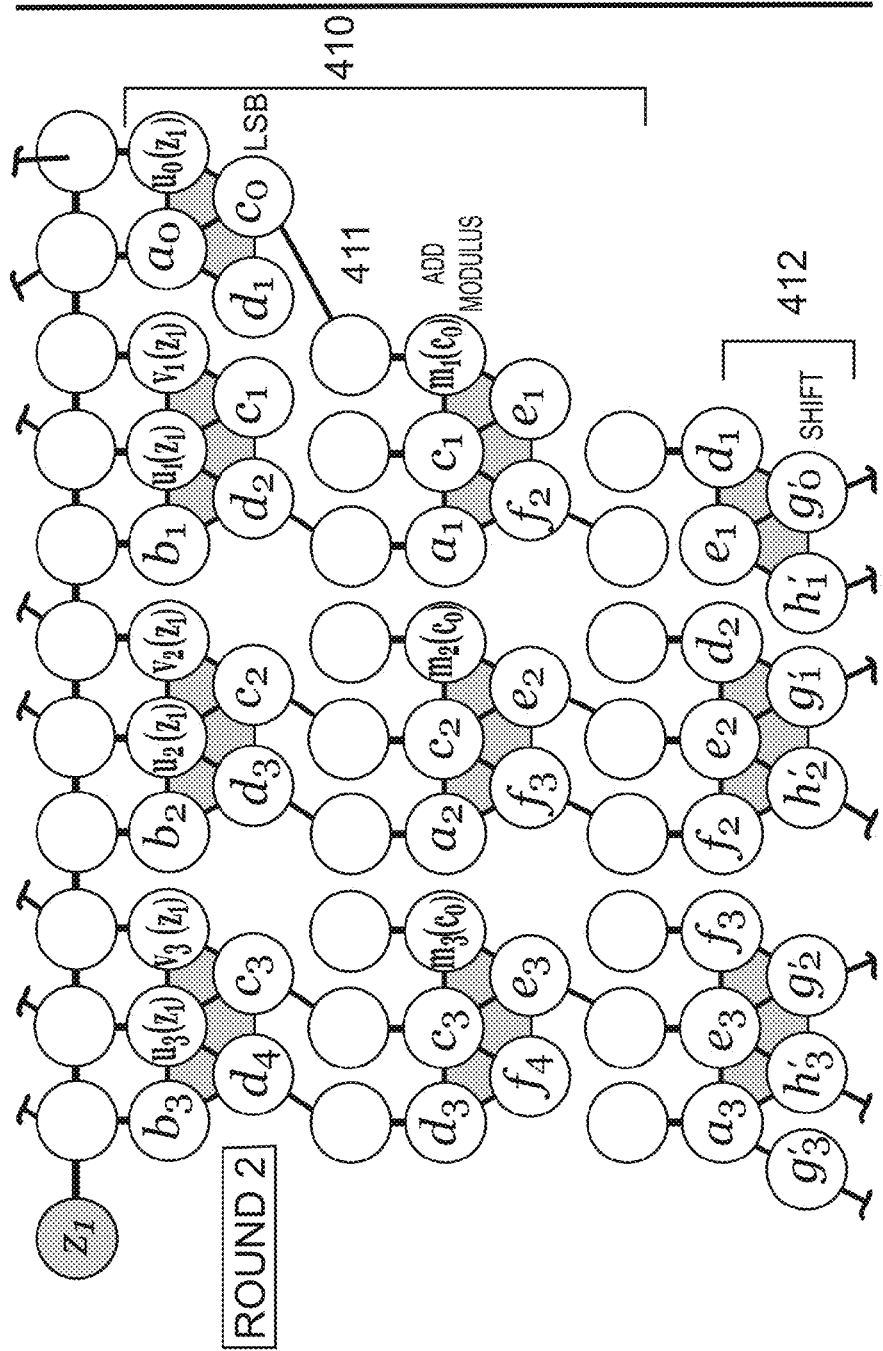

QUANTUM ARITHMETIC ON TWO-DIMENSIONAL QUANTUM ARCHITECTURES

TECHNICAL FIELD

Generally, this application relates to quantum computational systems. More specifically, the application relates to arithmetic on a two-dimensional (2D) quantum architecture for producing non-modular and modular addition and multiplication that may be used, for example, within Shor's factoring algorithm.

BACKGROUND

Quantum architecture is concerned with the layout of qubits and their allowed interactions in order to be physically realizable as well as to execute algorithms efficiently, such as Shor's factoring algorithm, according to certain resources. Shor's factoring algorithm is a central result in quantum computing with an exponential speed-up over known classical algorithms. Shor's algorithm achieves prime factorization through processing several cases. As a known example of such a quantum-classical separation in performance, much effort has been devoted to realistic implementations of factoring on a quantum computer. Accordingly, there is much current interest in running Shor's factoring algorithm.

Previous approaches to Shor's factoring algorithm assume one dimensional (1D) architectures or arbitrary, long-range interactions. For example, the most mature approaches are trapped ions and superconducting qubits, while a new topological approach that may, for example, be realized using 1D nanowires promises to have much better fault tolerance capabilities. However, 1D quantum architecture may be limited to how many operations may be applied concurrently. For example, 1D quantum architecture may require many movement operations because a qubit may have no more than two neighbors.

Additionally, previous approaches to quantum arithmetic algorithms and Shor's factoring algorithm assume ancillae are expensive (perhaps because of error correction requirements) and that execution time is not the bottleneck, to optimize for circuit width at the expense of circuit depth or size. For example, the transform adder by Draper is an influential idea that uses an inherently quantum idea (changing the basis of addition) so that adding a fixed classical number to a quantum number can be performed only with single-qubit rotations, which can be performed concurrently and in constant-depth. The benefit of being able to perform multiplication through repeated constant-depth additions may be mitigated by the cost of running a quantum Fourier transform to get into and out of the Fourier basis, to get the overflow bit needed for trial subtraction in the VBE scheme for modular reduction named after Vedral, Barenco, and Ekert.

However, there exists a large body of work applying classical ideas to quantum logic. Draper, Kutin, Rains, and Svore describe the first logarithmic-depth adder using carry-lookahead techniques to compute and propagate the carry bit in parallel (in a logarithmic-depth binary tree) among the bit positions to be added. A linear number of qubits are required. Alternatively, Gossett uses carry-save techniques to add numbers in constant-depth and multiply in logarithmic-depth using an encoding, but at a quadratic cost of qubits. The underlying idea of encoded adding, sometimes called a 3-2 adder, derives from Wallace trees.

Choi and Van Meter discussed 2D architectures by designing an adder that runs in $\Theta(\sqrt{n})$'-depth on 2D NTC using $\Theta(n)$-qubits.

Takahashi and Kunihiro have also discovered a linear-depth and linear-size adder using zero ancillae. Takahashi and Kunihiro also discovered an adder with variable tradeoffs between $O(n/d(n))$ ancillae and $O(d(n))$-depth for $d(n)=\Omega(\log n)$.

After fixing on an adder circuit, it may be straightforward to implement a multiplier as repeated addition of shifted sums (partial products). However, this may not be the simplest approach conceptually, especially when the need to perform modular reduction either after every addition or after each multiplication.

Once the adder building block is decided, many works extrapolate it into a modular exponentiator, through various paths of multiplication and modular reduction. This is the approach taken by Beauregard to construct a cubic-depth quantum period-finder using only 2n+3 qubits on AC, by combining the ideas of Draper's transform adder and Vedral et al.'s modular arithmetic blocks. This approach was subsequently adapted to LNN by Fowler, Devitt, and Hollenberg to achieve exact resource counts for an $O(n^3)$-depth quantum period-finder. Kutin later improved this using an idea from Zalka for approximate multipliers in $O(n^2)$-depth. However, these previous approaches to optimize for circuit width at the expense of circuit depth or size under the assumption that ancillae are expensive and that execution time is not the bottleneck.

SUMMARY

Disclosed herein are methods, systems, and devices that use 2D quantum architecture and produce non-modular and modular addition and multiplication that may be used, for example, within Shor's factoring algorithm. Contrary to previous approaches to quantum algorithms, such as Shor's factoring algorithm, the embodiments may optimize in favor of circuit width and may assume that circuit depth may be a factor. Additionally, the embodiments may assume that ancillae may be cheap, concurrent control may be available and scalable, and execution time may be the bottleneck. Additionally, the embodiments may provide for less movement operations and may provide more neighbors for qubits to interact.

As described above, Shor's factoring algorithm may be a central result in quantum computing with an exponential speed-up over known classical algorithms. As an example of such a quantum-classical separation in performance, much effort has been devoted to realistic implementations of factoring on a quantum computer. At an architectural level, the gap between the theoretical algorithm and an experimental implementation may be bridged by describing the layout and interactions of qubits at an intermediate level of abstraction, devising a model for measuring circuit resources. Toward that end, disclosed herein are systems, methods, and devices towards such a quantum architecture in two dimensions (2D) that may allow concurrent (parallel) two-qubit operations between neighboring qubits in the form of arithmetic building blocks.

For example, a two-dimensional (2D) nearest-neighbor quantum architecture may be used for a quantum algorithm, such as Shor's factoring algorithm, in the form of arithmetic building blocks. The arithmetic building blocks may include modular addition, modular multiplication, and non-modular exponentiation. Additionally, disclosed herein are methods and systems that provide asymptotics for the circuit resources (depth, size, width) consumed by these arithmetic circuits and show an improvement in depth at the expense of increased width over existing nearest-neighbor implementations. For example, the embodiments may be used to implement a polylogarithmic depth quantum architecture for Shor's algorithm.

Previous approaches have assumed that qubits are expensive and that execution time (depth) or number of qubits (width) are not the limiting constraints. Therefore, the previous approaches make performance tradeoffs to reduce circuit width at the expense of circuit depth and size. The embodiments disclosed herein may make the opposite assumption. For example, the embodiments may assume that if ancillae are cheap, concurrent control and additional neighboring qubits may be available and scalable, and execution time may be the bottleneck, thus circuit depth may be a factor and the embodiments may be optimized in favor of circuit width.

BRIEF DESCRIPTION OF THE DRAWINGS

FIGS. 11A-G depicts a modular multiplier performing seven rounds of Montgomery modular multiplication.

DETAILED DESCRIPTION OF ILLUSTRATIVE EMBODIMENTS

Shor's factoring algorithm is a central result in quantum computing with an exponential speed-up over known classical algorithms. As an example of such a quantum-classical separation in performance, much effort has been devoted to realistic implementations of factoring on a quantum computer. At an architectural level, the gap between the theoretical algorithm and an experimental implementation may be bridged by describing the layout and interactions of qubits at an intermediate level of abstraction, devising a model for measuring circuit resources. Toward that end, in one example embodiment a quantum architecture in two dimensions may be used to allow concurrent (parallel) two-qubit operations between neighboring qubits in the form of arithmetic building blocks, or circuits for performing different arithmetic functions.

While the arithmetic building blocks or circuits for performing different arithmetic functions may be described with regard to Shor's factoring algorithm, the embodiments described herein may be applied to any quantum algorithm. For example, quantum algorithms may be implemented using arithmetic building blocks in a 2D nearest-neighbor quantum architecture. As will be further described below, these arithmetic building blows in 2D nearest-neighbor quantum architecture may include modular addition using Gossett's carry-save addition, modular multiplication using Montgomery's method, and non-modular exponentiation.

Figure 1:
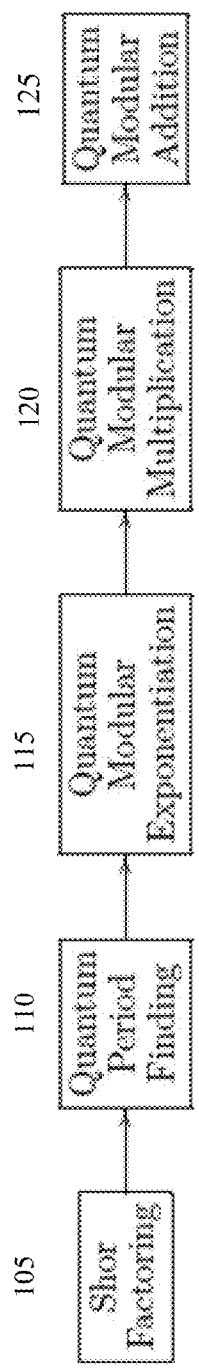
FIG. 1 depicts a mapping of Shor's factoring algorithm implemented with quantum modular multiplication and quantum modular addition.
Figure 2:
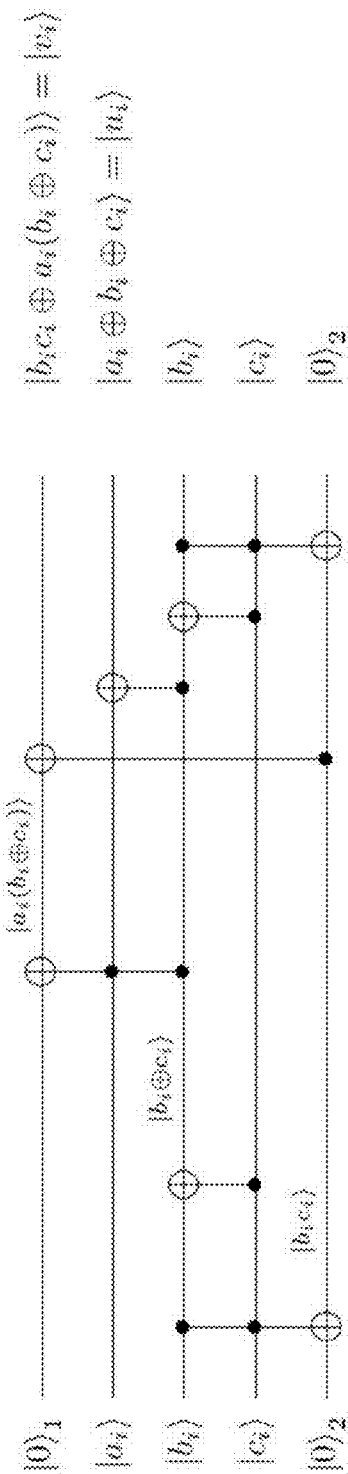
FIG. 2 depicts addition using a 3-2 added mapped into 2D.

FIG. 1 depicts a mapping of Shor's factoring algorithm implemented with quantum modular multiplication and quantum modular addition. Since factoring may be a number-theoretic problem, factoring may be reduced to arithmetic. As shown in FIG. 1, Shor Factoring 105 may be reduced to Quantum Period Finding 110, which may be reduced to Quantum Modular Exponentiation 115. Quantum Modular Exponentiation 115 may be reduced to Quantum Modular Multiplication 120, which may be reduced to Quantum Addition 125. FIG. 2 depicts reduced arithmetic functions of Shor's factoring algorithm, which may be created according to the embodiment shown with respect to FIG. 1.

Referring again to FIG. 1, modular addition, such as Quantum Modular Addition 125, may be implemented using a variant of Gossett's carry-save encoding. As will be further described below, Modular multiplication, such as Quantum Modular Multiplication 120, may be implemented using a variant of Montgomery's method. In contrast to previous approaches, which assume 1D architectures or arbitrary long-range interactions, Quantum Modular Multiplication 120 and Quantum Modular Addition 125 may be implemented in a 2D architecture. Quantum modular exponentiation and quantum non-modular multiplication may also be implemented in a 2D architecture. A mapping to a 2D architecture with nearest-neighbor interactions is further described below for Gossett's carry-save addition (CSA), Montgomery's modular multiplication, and non-modular multiplication.

The building blocks, such as 105 and 110, shown in FIG. 1 may assume an efficient unbounded-fanout operation and a phase estimation procedure.

Many quantum algorithms, such as Shor's algorithm, may achieve prime factorization through processing several cases. For example, the hardest cases may be solved by repeated iterations of Quantum Period Finding (QPF) to amplify success probability. A simpler constituent building block, addition such as Quantum Modular Addition 125, may be used to build back up to Quantum Period Finding 110.

Following the notation of Van Meter, architectural models may be defined of various degrees of realism. A model and an architectural implementation may be distinguished as follows. A model may be considered to be a set of constraints and rules for the placement and interaction of qubits. An architecture, or an implementation, may be a particular instantiation following the constraints of a certain model, including a particular layout of qubits (as a graph of vertices) and allowed interactions (edges between the vertices).

The most general model may be called Abstract Concurrent (AC) and may allow arbitrary, long-range interactions between any qubits and gates operating on arbitrary numbers of qubits concurrently. This may correspond to a graph with an edge between every two pairs of nodes. This may be the model assumed by most quantum algorithms. This model may be excuted using "flying" trapped ions that may be shuttled and rearranged in a 2D layout with junctions.

Another model restricts interactions to nearest-neighbor, two-qubit, concurrent gates (NTC) in a regular one-dimensional chain (1D NTC), which may also called be linear nearest-neighbors (LNN). This may correspond to a line-graph. This may be a natural model for "stationary" trapped ions, which may be confined in a linear chain where only adjacent ions can interact. This may be experimentally easier than moving ions around to accomplish the previous model but may have the drawback that much effort is spent shuffling data up and down the chain and swapping their states through each other.

To relieve this congestion, a model may be used with greater connectivity, a simple layout, and simple connection rules. Extended to a two-dimensional regular grid (2D NTC), each qubit may have four neighbors, and there may be an extra degree of freedom in which to move data. This may be a natural model for superconducting qubits and related topological approaches that may use a superconducting substrate. These systems may use the same modem VLSI fabrication techniques that may provide classical digital processors with arbitrary 2D layouts and planar connectivity. Accordingly, the embodiments disclosed herein are not limited to a regular 2D grid; the embodiments described herein contemplate a planar graph of interactions any degree, such as 1, 3, 4, 5, or the like. For example, the embodiments described herein may contemplate a plan graph of interactions with a degree of six. In some embodiments, edges may not be allowed to intersect and the plane may allow all qubits to be accessible from above or below by control and measurement apparatuses.

Figure 3:
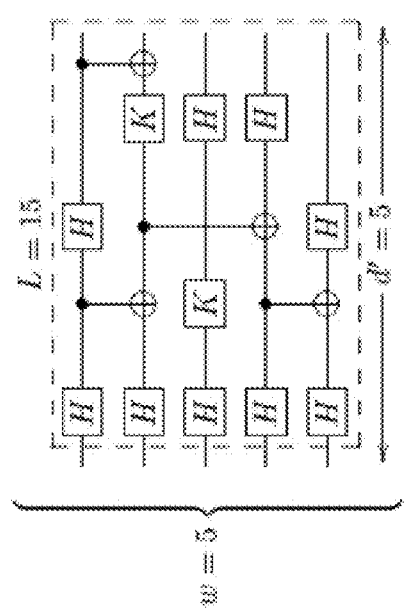
FIG. 3 depicts quantum architecture resources.

FIG. 3 depicts quantum architecture resources. As shown in FIG. 3, the efficiency of an algorithm running on a particular architecture may be measured in terms of three main resources; circuit size L, circuit depth d, and circuit width w. The circuit size may be the total number of non-identity gates. The circuit depth may be the number of concurrent time-steps. The circuit width may be the total number of qubits. For circuit width, it is customary to count ancillary scratch space, and not the qubits needed to store the input and output, since presumably this may be the same for all equivalent circuits. However, at higher-levels of algorithm design, the inputs and outputs of lower-level building blocks may be considered ancillary, which may affect results.

Following the convention of Fowler et al., compound two-qubit gates, which may also absorb adjacent single-qubit gates, may be counted. This may be done, for example, to consider that two-qubit gates take an order of magnitude more time to execute than a single-qubit gate (at least on trapped ions). A Toffoli may be counted as 5 two-qubit gates, following the decomposition in Nielsen and Chuang, although it may be possible to improve upon this by a constant.

In the above approach, the T or $$\frac{\pi}{8}$$

gate may be difficult to implement in many error-correcting codes as well as using Ising anyons for topological quantum computation, which may only perform Clifford operations. A more detailed accounting of circuit resources may include T gates as a separate resource to be minimized, asymptotically and with numerical constants.

Some technologies may require active error correction that may include error correction on explicit identity gates as well as the other quantum gates on all qubits in every concurrent time-step. To measure this, circuit area may be defined as the product of circuit width and circuit depth, and the number of identity gates may be estimated as circuit area minus circuit size.

A topological qubit using Majorana fermions on 1D nanowires may have low error rates (approximately a $10^{-30}$ single-qubit error probability), which may remove the need for an active error-correcting code for the useful lifetime of the qubit. This technology may not need non-trivial identity gates as the technology requires active error correction on all that that may include identity gates. On the other hand, the embodiments described herein, may not require active error correction or may require very little error correction.

In trapped ion approaches, dynamical-decoupling or some other active procedure may be required to achieve similar error rates. In this respect, topological approaches to quantum computation may provide cheap ancillae qubit. Therefore, topological qubits may compare very favorably with non-topological technologies.

In classical circuits, fanouts may be taken for granted: this may be the same as copying the output of a gate into the inputs of multiple succeeding gates. In quantum circuits, the no-cloning result means unentangled copies of arbitrary states may not be created. However, a quantum fanout may simply be an entangled copy using CNOT gates. This may be a basic operation in many other quantum operations such as, for example, the arithmetic disclosed herein units where a large register may need to be controlled on (entangled with) a single control qubit.

To fan out one source (control) qubit to n targets, one may expect to run a binary tree of concurrent CNOT operations that may complete in $\log_2$ n-depth. However, due to recent insights from measurement-based ("one-way") quantum computing, such a fanout may be performed in constant depth via the creation of an n-qubit cat state.

There are various equivalent circuits for creating such a cat state and fanning out in O(l)-depth, O(L)-size, and O(L)-width, where the multiplicative constant may never exceed 4 using the disclosed circuit resource model described above. The existence of such an unbounded fanout gate in may be assumed in the disclosed arithmetic circuits, but the asymptotic circuit resources above may be included. The inclusion fanout circuit may not significantly affect the comparison between the disclosed embodiments and other implementations, either asymptotically or numerically.

Figure 4:
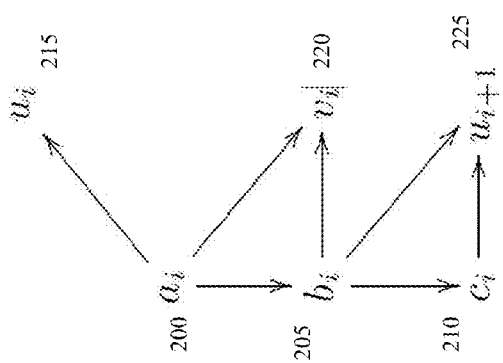
FIG. 4 depicts a carry-save adder circuit layout on 2D NTC P4.

FIG. 4 depicts an example embodiment of carry-save adder circuit layout on 2D NTC P4. As shown in FIG. 4, the carry-save adder circuit is a 3-2 adder; there are three inputs and two outputs. The inputs are $a_i$ at 200, $b_i$ at 205, and $c_i$ at 210. The outputs are $u_i$ at 215 and $u_{i+1}$ at 225.

In one disclosed embodiment, the carry-save adder circuit may use one more gate and one more ancillae than the equivalent quantum full adder circuit taught by Gossett due to architectural constraints.

Using the Toffoli gate decomposition disclosed by Nielsen and Chaung, the two control qubits and single target qubit may be mutually connected to each other. Given this potential constraint, and the interaction of the CNOTs in FIG. 2, these qubits may be rearranged on a 2D planar grid to get the layout shown in FIG. 4.

Note that this may be for addition at a single bit position; however, the layout may be stacked vertically for the lower-order bit position i−1 above and the higher-order bit position i+1 below. This column of $u_i$'s and $v_i$'s may be cascaded into another adder layout to the right to continue adding further.

However, this may not be a complete layout as there may not be a way to move data into the inputs $a_i$, $b_i$, and $c_i$. Therefore, an additional column of qubits may be need to be inserted.

The following description of the embodiments assumes the reader is familiar with Gossett's 3-2 carry-save adder (CSA), and carry-save encoding in which a conventional L-bit number may be represented as a (non-unique) sum of two L-bit numbers, usually denoted as u and v.

FIGS. 5-8, demonstrate an example embodiment of modular addition on converting the sum of three 4-bit integers into the modular sum of two 4-bit integers (i.e., L=4).

Figure 5:
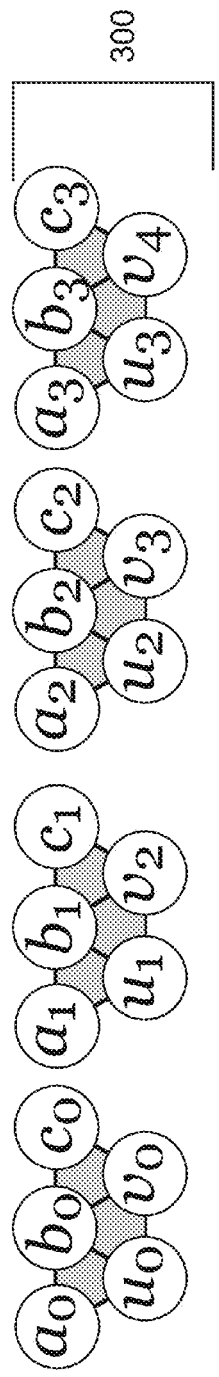
FIG. 5 depicts an initial carry-save addition of 3 numbers to 2 numbers (non-modular).

FIG. 5 depicts an example embodiment of an initial carry-save addition of 3 numbers to 2 numbers (non-modular). At 300, 4 CSA's may be run in parallel on the input numbers (a, b, c) and produce the output numbers (u, v) which may have an overflow bit $v_4$, meaning that the output may represent a 5-bit integer. A number $x_i$ means the i-th bit of number x, with significance $2^i$.

In an example embodiment, which may implement Gossett's modular reduction on a 2D architecture, overflow bits may be truncated and added back the modular residue. In order to guarantee that no overflow bits remain at the end of the modular addition (i.e. that a O-bit integer may be left), the three higher-order bits from this initial CSA round ($u_3$, $v_3$, $v_4$) may be truncated.

Each of these bits may serve as a control for adding in their modular residue to a running total. The modular residues may be precomputed classically. In this case, it may be $2^3 \bmod m$ for the two additions controlled on ($u_3$, $v_3$) and $2^4 \bmod m$ for the one addition controlled on $v_4$. The L-bit modulus may be denoted by m.

Figure 6:
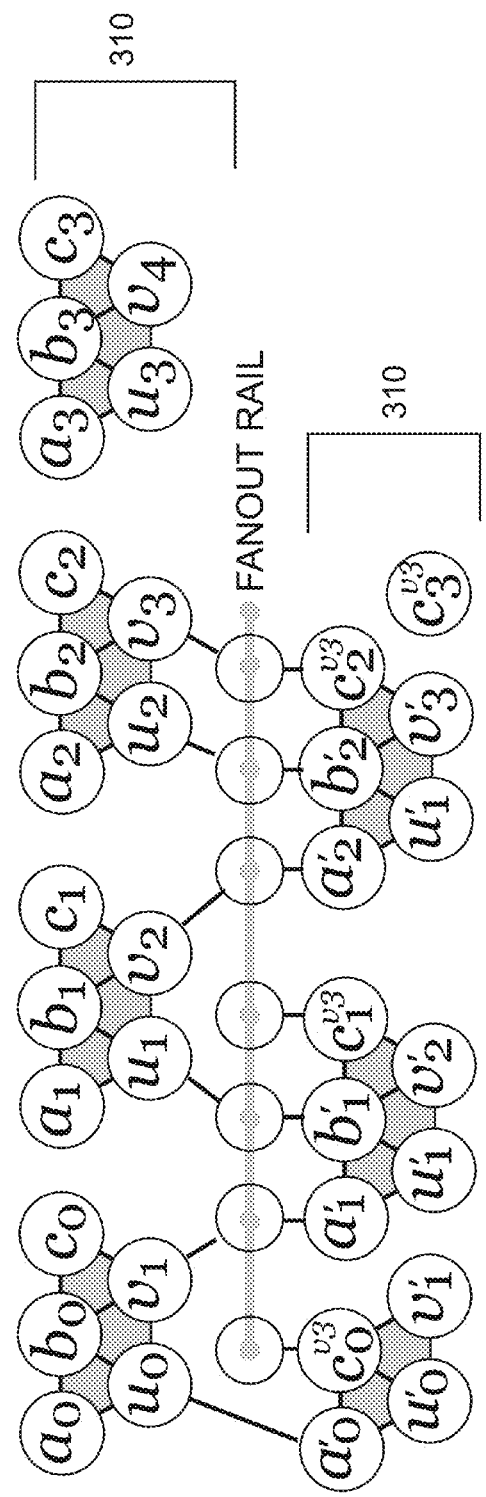
FIG. 6 depicts a modular reduction using the modular residue on overflow bit $v_3$.

FIG. 6 depicts an example embodiment of a modular reduction using the modular residue on overflow bit $v_3$. At 310, the fanout rail may be used to distribute the modular residue controlled on $v_3$, denoted as:

$$c^{v3} = 2^3 \bmod m$$

This fanout may be done in constant depth, and $c^{v3}$ may have L bits, which may be added to the CSA-encoded results of 300. Note that there is bit of significance $2^3$, which is $c_3^{v3}$, so this may not be added at this time; rather, this may be passed onto the next step when there may be more $2^3$ bits to combine with.

Figure 7:
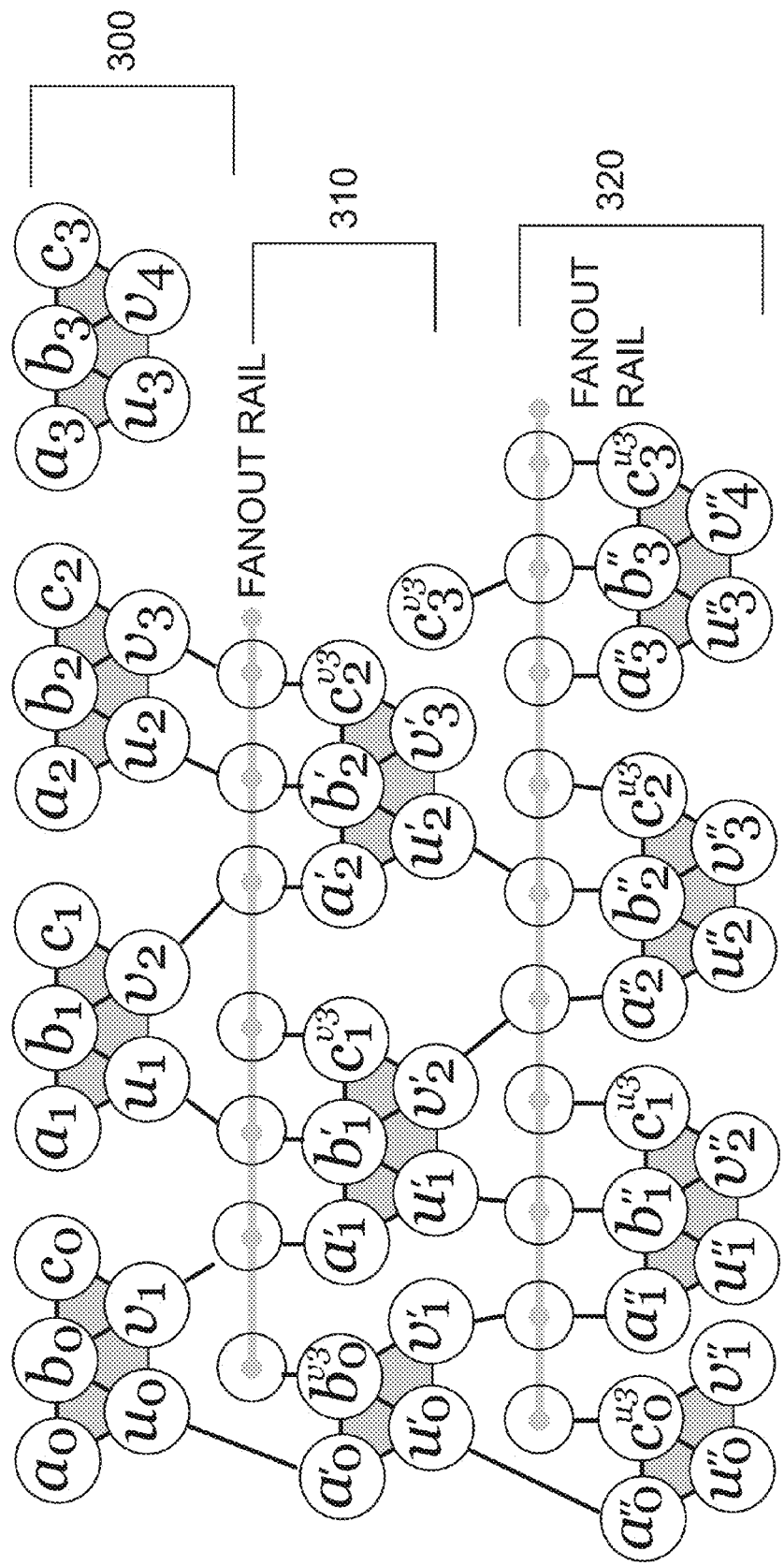
FIG. 7 depicts a modular reduction using the modular residue on overflow bit $u_3$.

FIG. 7 depicts an example embodiment of a modular reduction using the modular residue on overflow bit $u_3$. At 320, an operation similar to what occurred at 310, shown with respect to FIG. 6, may be performed. However, referring again to FIG. 7, at 320 the modular residue may be controlled on $u_3$. The modular residue may be the same, just with this different control bit:

$$c^{u3} = 2^3 \bmod m.$$

This fanout may be done in constant depth, and $c^{u3}$ may have L bits, which may be added to the CSA-encoded results of 310. The high-order bit $v'''_4$ may be discarded as it may be 0.

Figure 8:
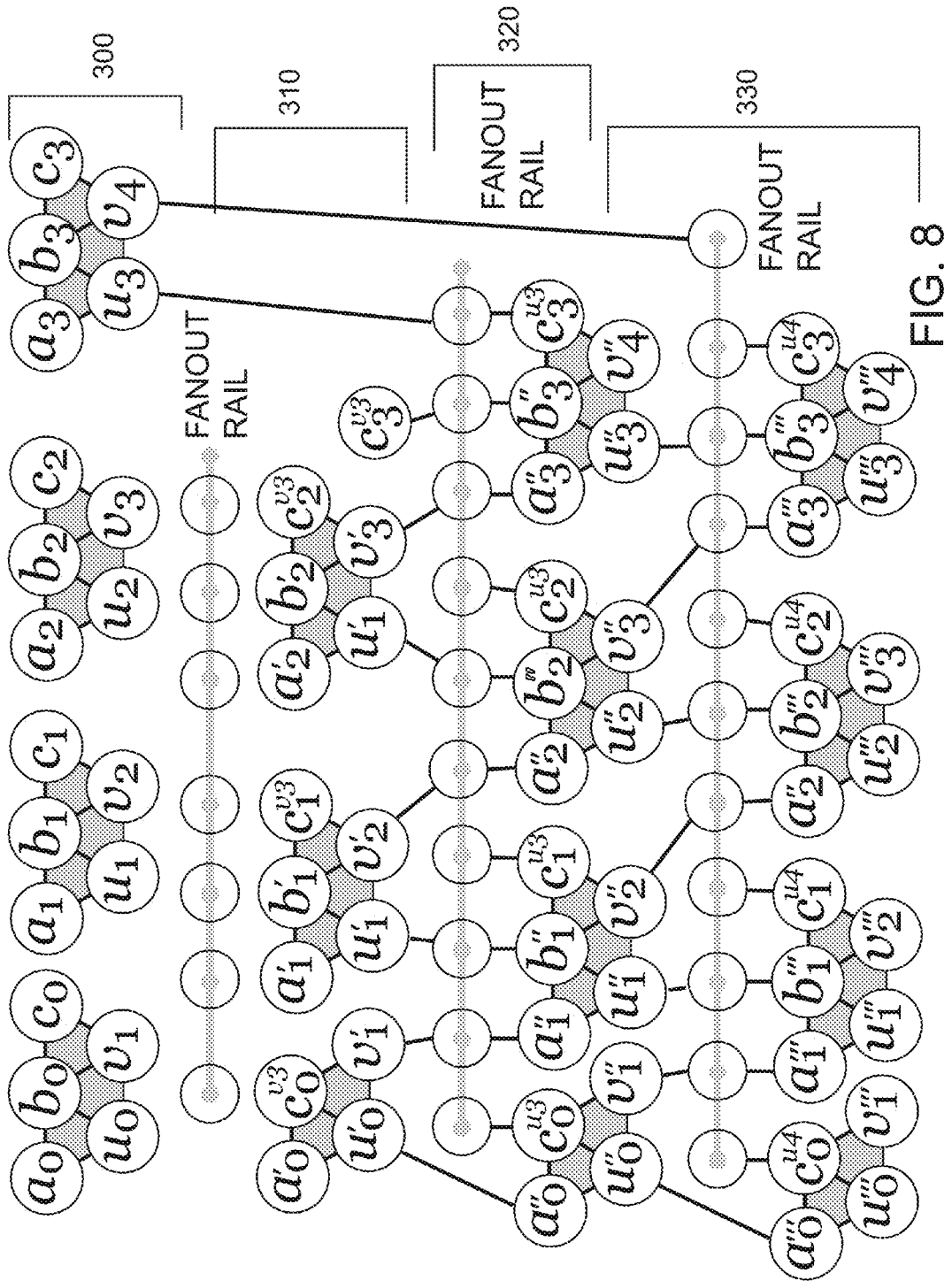
FIG. 8 depicts a modular reduction using the modular residue on overflow bit $v_4$.

FIG. 8 depicts an example embodiment of a modular reduction using the modular residue on overflow bit $v_4$. As shown in FIG. 8, at 330, a similar operation may be performed as 310 (FIG. 6) and 320 (FIG. 7). However, at 330 the modular residue may be controlled on $v_4$. The modular residue may be denoted as:

$$c^{v4} = 2^4 \bmod m$$

This fanout may be done in constant depth, and $c^{v4}$ may have L bits, which may be added to the CSA-encoded results of 320 (FIG. 7). The high-order bit $v'''_4$ may be discarded as it may be 0.

Neglecting the final bit $v'''_4$, the final modular sum of a+b+c may be u'''+v'''.

The adder circuit described above may be used to create a multiplication circuit. The traditional approach to a Montgomery multiplier is to do modular reduction either after each addition using a VBE-style approach or to do approximate division and subtraction. In one example embodiment, a Montgomery multiplier may be adapted for reversible circuits on a 2D architecture. In another example embodiment, a Montgomery multiplier may be implemented in such a way to yield depth improvements over 1D NTC, but with more width. In another example embodiment, a Montgomery multiplier may be implemented in such a way to yield a greater asymptotic improvement in depth, but with a greater constant and more width.

Disclosed below is an example embodiment of an implementation of a Montgomery multiplier.

Exponentiation of two L-bit numbers a and b, modulo a third L-bit number N, may be reduced to L steps of Montgomery multiplication. In each step i, a partial product may be added to a running n-bit total, which is bit $a_i$ times all of b. For example, every bit of b with $a_i$ may be entangled, which may also be conditioned on a control qubit for modular exponentiation (MODEXP). The fanout gat may be used to entangle. Addition may be done with the carry-save adder described in the previous section, and left in carry-save encoding. The modulus, which may be an L-bit number, maybe added to make the LSB 0 conditioned on the least significant bit (LSB) of this running total. The register maybe shifted down one bit. This may be done by, for example, having the ancillae for round i+1 be shifted by one bit from the ancillae for round i. The ancillae may be kept around for the entire length of the computation.

The total resources to multiply two L-bit numbers modulo N is given in Table 2:

TABLE 2

Comparison of resource counts for modular multiplication

| Implementation | Depth | Width | Size |
| --- | --- | --- | --- |
| Kutin-Zalka | 11L + 7log$_2^2$ L + O(log$_2$ L) | 3L + log$_2$ L + 1 | 5L$^2$ + O(L log L) |
| Montgomery | 18L + L · O(1) | 6L$^2$ − 2L + O(L) | 23L$^2$ − L + O(L) |

As shown above, the conventional approach (Kutin-Zalka) of repeated additions and then modular reduction by division and subtraction, is compared to Montgomery multiplication (which may include L rounds).

The two factors a or b may need to be initially placed one of the Montgomery representation, which may occur by simply multiplying by $2^L \bmod N$. This may be done by doing an additional modular multiplication on a, which in the phase estimation approach begins in a known classical state |1>. Therefore, this may be computed classically.

This implementation may have asymptotic depth that may be equivalent to Kutin-Zalka up to logarithmic terms, at an increase of width from linear to quadratic.

In one example embodiment, Montgomery Multiplication may be parallelized.

Montgomery multiplication may be more elegant than doing modular reduction by dividing and subtracting, and may provide the key to further parallelizing phase estimation. However, in order for this to occur, the L Montgomery rounds described above may need to run in parallel. Fortunately, the techniques of function table narrowing and composition used by Kitaev et al. in their parallelized finite automata may assist in this respect.

The function tables in this case may take as input the preceding LSB of the previous Montgomery round and outputs the sum of the current Montgomery round. Because there may be two values for a single input (0 and 1), there may be 2 kinds of what may be referred to as 1-rounds, and such a table may have 2 rows. However, when the two function tables from successive Montgomery rounds are combined into a 2-round, two LSBs may be required as inputs, and there may be 4 kinds, each with 4 rows. In general, in producing a $2^k$-round, there may be a need to account for $2^{k+1}$ kinds of tables, each with $2^{k+1}$ rows. It may be preferable to combine these functions in-place as much as possible, but the cost of moving the data around using swap gates, teleportation channels, or other means of qubit movement may be neglected.

The tables may be combined in a tree of logarithmic depth, which may include layers of combinations. The final overall depth may depend on when combining stops and when the tables are applied.

In the first layer, there may be L×1-rounds. In the second layer, there may be (L/2)×2-rounds. In the $\sqrt{L}$-th layer, there may be $L/\sqrt{L} \times \sqrt{L}$-rounds. So the depth of this tree may contain $\log_2(\sqrt{L})$ layers, or $$l/2$$

where $L=2^l$. However, each combining operation may depend on the number of rows. Combining 1-rounds into 2-rounds requires producing 4 rows, combining 2-rounds into 4-rounds produces 8 rows, and the final combination to produce $\sqrt{L}$-rounds will produce $2^l$ rows. The sum of $4+8+ \ldots +2^l$ is O(L), which gives may not give improvement of running a non-parallel Montgomery multiplication.

However, it may not be necessary to wait for all the tables to be combined before applying these tables to the inputs. One goal may be for the combination and application phases to balance so that neither one is the depth bottleneck for the entire procedure. Suppose that combining tables stops at the level of k-rounds, where $$k = \sqrt[p]{L} = L^{1/p}.$$

Then the total number of table rows that touched, which may be the same as the depth of operations for table combining, may be $$L^{1-\frac{1}{p}}.$$

Furthermore, if combining is stopped at k-rounds, $L^{2/p}$ rows may still be applied.

Setting these two quantities to be equal:

$$L^{1-\frac{1}{p}} = L^{2/p}$$

The optimal value may be p=3, that is, stop combining tables may stop at $\sqrt[3]{L}$-rounds.

A total depth of operations for this version of Montgomery multiplication may be $O(L^{2/3})$, which may be asymptotically better than the Kutin 1D NTC depth of O(L), but using a complicated procedure which may have a larger constant. However, this may allow multiplication of two quantum numbers together with modular reduction built-in. In quantum modular exponentiation, L numbers may be multiplied together serially, which may give $O(L^2)$-depth in the 1D NTC case. However, L numbers are multiplied together in a logarithmic depth binary tree using Montgomery multiplication; this may produce a depth of $O(L^{2/3} \log_2 L)$, which is sub-quadratic.

In one example embodiment, Montgomery modular multiplication may be implemented using a constant-depth carry-save adder, such as the example embodiments of constant-depth carry-save adders described above. The following description of this embodiment assumes the reader is familiar with Gossett's 3-2 carry-save adder (CSA), and carry-save encoding in which a conventional L-bit number may be represented as a (non-unique) sum of two L-bit numbers, usually denoted as u and v. In the disclosed embodiments, a conventional L-bit number may be generally represented with 2L−1 bits in CSA encoding, ($u_0$ through $u_{L-1}$, and $v_1$ through $v_{L-1}$).

The following paragraphs go through a classical numerical example of Montgomery multiplication (that may not assume reversible or irreversible operations) using the embodiments disclosed herein. Additionally, the paragraphs below describe an example embodiment in terms of a 2D architecture and a procedure for performing Montgomery multiplication using reversible logic (CNOT and Toffoli gates), using a specific case of L=4. When the bits used are quantum bits, this may provide a quantum implementation of Montgomery multiplication.

The problem of modular multiplication is as follows:

Given three n-bit integers x, y, m, compute z=xy mod m.

Montgomery multiplication may be a surreal method for computing this modular product using only n rounds of addition, which may be how long it would normally take to perform ordinary, non-modular multiplication.

Montgomery multiplication proceeds by a series of rounds on a running sum that passes from one round to the next, n rounds for n-bit input numbers.

As suggested above, the following paragraphs work out a simple classical example of Montgomery multiplication using the embodiments disclosed herein. One example embodiment may be in binary instead of decimal, as this may be more analogous to what may occur in reversible logic, and eventually, quantum logic.

Montgomery multiplication may require input numbers to be encoded into a Montgomery representation, which may be bit-shifting the entire length of the number up (n bits) modulo m, or perform modular multiplication by $2^n$. The Montgomery representation of x may be denoted as X and that of y as Y:

$X = x \cdot 2^n \bmod m$ $Y = y \cdot 2^n \bmod m$

The Montgomery multiplication operation modulo m on two numbers may be denoted by $\star_m$ in Montgomery representation. Therefore, an output number Z may be computed, also in Montgomery representation, by:

$$Z = X \star_m Y = z \cdot 2^n \bmod m$$

To recover z as a conventional number, the number Z may need to be bit-shift down again the entire length of the number (n bits) modulo m, or perform modular division by $2^n$. This may be cumbersome to do; however in, one example embodiment, this may be performed using the reverse Euclidean algorithm. In another example embodiment, the following property of Montgomery multiplication may be used:

$$z = Z \star_m 1$$

Here then is a worked classical example for n=4, x=11, y=6, and m=13. To verify in advance, some other conventional, non-Montgomery way may be used to calculate the answer, such as calculating the equation using GNU Octave: ti xy mod m=11×6 mod 13=1

In determining the answer using the Montgomery way, the suffixes d and b may be used denote that a number is in decimal or binary, respectively, where there might be confusion.

$$x = 11d \times 2^4 \bmod 13 = 7d = 0111b$$

$$y = 6d \times 2^4 \bmod 13 = 5d = 0101b$$

n=4 rounds of addition may be performed on a running sum starting at 0. Each round i may include the following:
1. Adding (non-modular) y times bit $x_i$ to the running sum.
2. If the least significant bit (LSB) of the running sum is 1, add m to the running sum. This may make the new LSB equal 0.
3. Shift the running sum one bit down (to truncate the 0 LSB).

The following table demonstrates how this may work in one example embodiment:

| Beginning sum | | | 0 | 0 | 0 | 0 | Comments |
|---|---|---|---|---|---|---|---|
| Round 1 | + | 1· | 0 | 1 | 0 | 1 | $x_0 \cdot y$ |
| | | | 0 | 1 | 0 | 1 | LSB = 1 |
| | + | | 1 | 1 | 0 | 1 | add m |
| | | 1 | 0 | 0 | 1 | 0 | shift ⇒ |
| | | | 1 | 0 | 0 | 1 | |
| Round 2 | + | 1· | 0 | 1 | 0 | 1 | $x_1 \cdot y$ |
| | | 1 | 1 | 1 | 0 | | LSB = 0 |
| | | 0 | 0 | 0 | 0 | | do not add m |
| | | 1 | 1 | 1 | 0 | | shift ⇒ |
| | | 0 | 1 | 1 | 1 | | |
| Round 3 | + | 1· | 0 | 1 | 0 | 1 | $x_2 \cdot y$ |
| | | 1 | 1 | 0 | 0 | | LSB = 0 |
| | | 0 | 0 | 0 | 0 | | do not add m |
| | | 1 | 1 | 0 | 0 | | shift ⇒ |
| | | 0 | 1 | 1 | 0 | | |
| Round 4 | + | 0· | 0 | 1 | 0 | 1 | $x_3 \cdot y$ |
| | | 0 | 1 | 1 | 0 | | LSB = 0 |
| | | 0 | 0 | 0 | 0 | | do not add m |
| | | 0 | 1 | 1 | 0 | | shift ⇒ |
| | | 0 | 0 | 1 | 1 | | = 3d |

It may be verified that 3 is the Montgomery representation of 1 by the following calculation:

$$1 \times 2^4 \bmod 13 = 3$$

Accordingly, the embodiments described above function properly and may be translated into a reversible 2D architecture.

FIGS. 9-11C illustrate an example embodiment of modular multiplication using Montomery's method for two 4-bit integers (x encoded as the sum u+v, and y encoded as the sum w+z) into a 4-bit integer (i.e., L=4).

Since the disclosed carry-save encoded numbers may have 2L–1 bits, 2L–1 Montgomery rounds may need to be performed. The steps in each round may be adapted to carry-save encoded numbers and reversible operations. The bits used below may be labeled with the same names as in FIGS. 9-11. The names may be unique within a round, but may be re-used in between rounds to emphasize that the operations and the roles played by the bits may be the same in each round. One exception may be the first round, shown at 400 with respect to FIG. 9, where some operations may be optimized because the running sum may initially be zero.

The notation t(c) may be used to mean that the bit t may be written controlled on the bit c.

Figure 9:
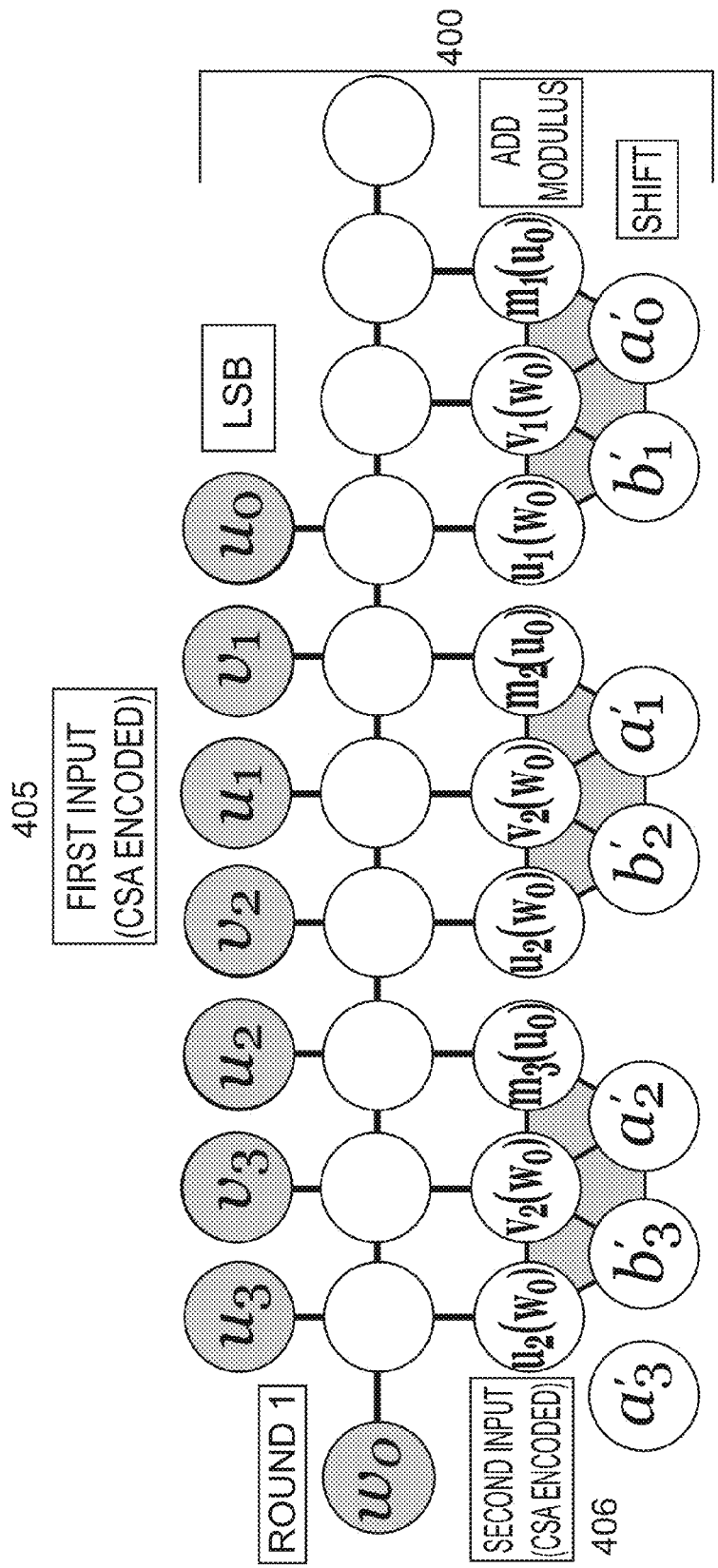
FIG. 9 depicts a modular multiplier performing a first round of Montgomery modular multiplication.

FIG. 9 depicts an example embodiment of a modular multiplier performing a first round of Montgomery modular multiplication. As shown in FIG. 9, the optimized, first round may be optimized to minimize some of the procedures described above. Given that the running sum bits are initially zero, there may not be 7 bits $\{a_3, b_3, a_2, b_2, a_1, b_1, a_0\}$ to add together. Therefore, the input bits x (except the LSB) may be controlled on the first bit of y: $\{u_3(w_0), v_3(w_0), u_2(w_0), v_2(w_0), u_1(w_0), v_1(w_0)\}$ and the modulus m controlled on the LSB of x: $\{m_3(u_0), m_2(u_0), m_1(u_0)\}$. These may be added together in just one layer of parallel carry-save additions.

The current running sum may have of 7 bits: $\{a_3, b_3, a_2, b_2, a_1, b_1, a_0\}$.

Add the first input, at 405, x=u+v controlled on a single bit of the second input $y_i$, at 406, (either $z_i$ or $w_i$ in carry-save encoding) using carry-save addition. Because bits of the same significance may be added, there may only be room to add some bits of the running sum: $\{a_0, b_1, b_2, b_3\}$. This choice may be arbitrary because any four bits with the significances $\{0, 1, 2, 3\}$ may have been chosen. This may leave the remaining bits unadded, and they may be considered part of the running sum now. This first round of addition at 400 may produce the new numbers c and d, and the running sum may now have the following bits $\{d_4, c_3, d_3, c_2, d_2, c_1, d_1, a_3, a_2, a_1\}$. $c_0$ may not be counted, but those bits may be kepts around as the control for the next step at 410, shown with respect to FIG. 10.

Figure 10:
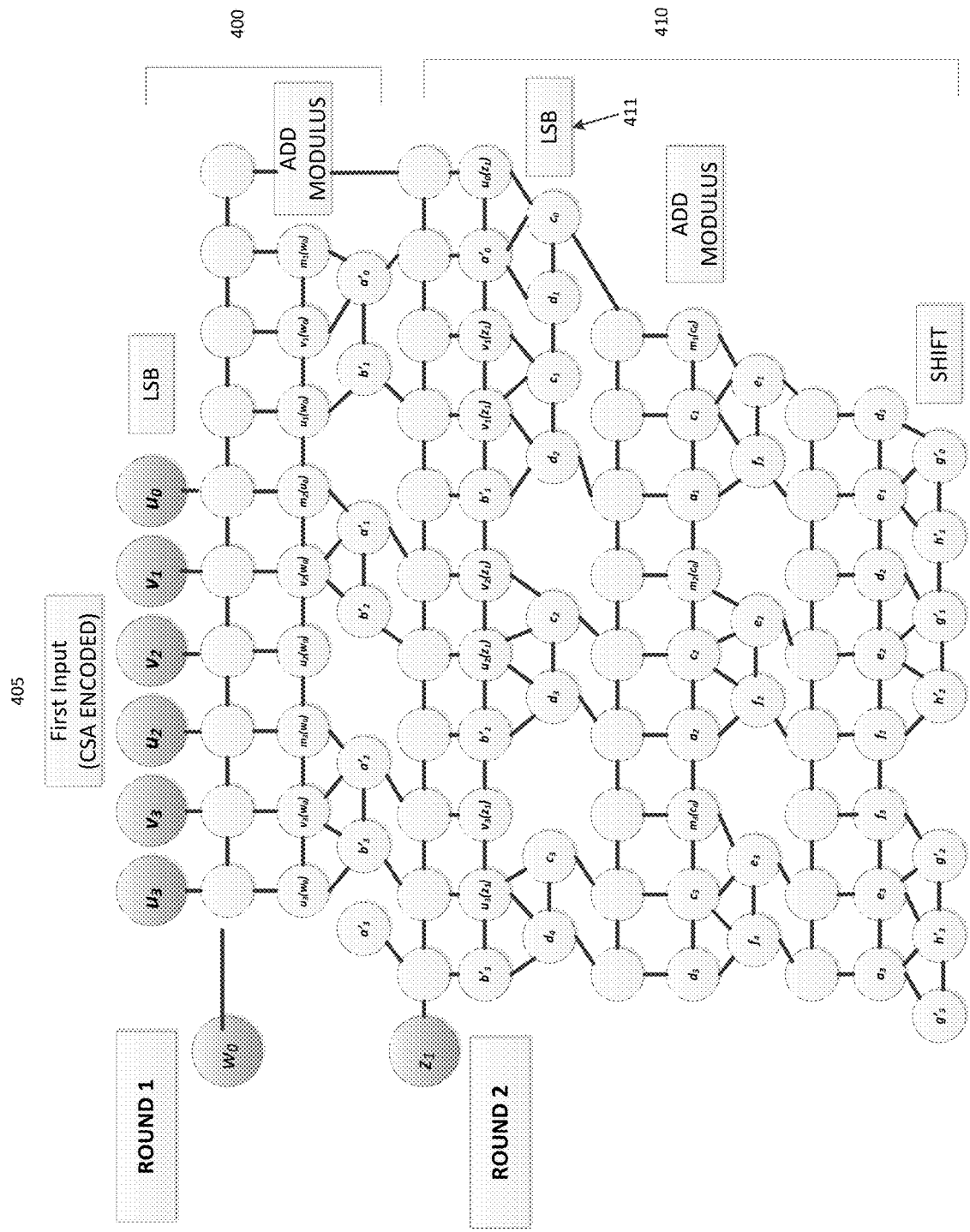
FIG. 10 depicts a modular multiplier performing a second round of Montgomery modular multiplication.
Figure 11A:
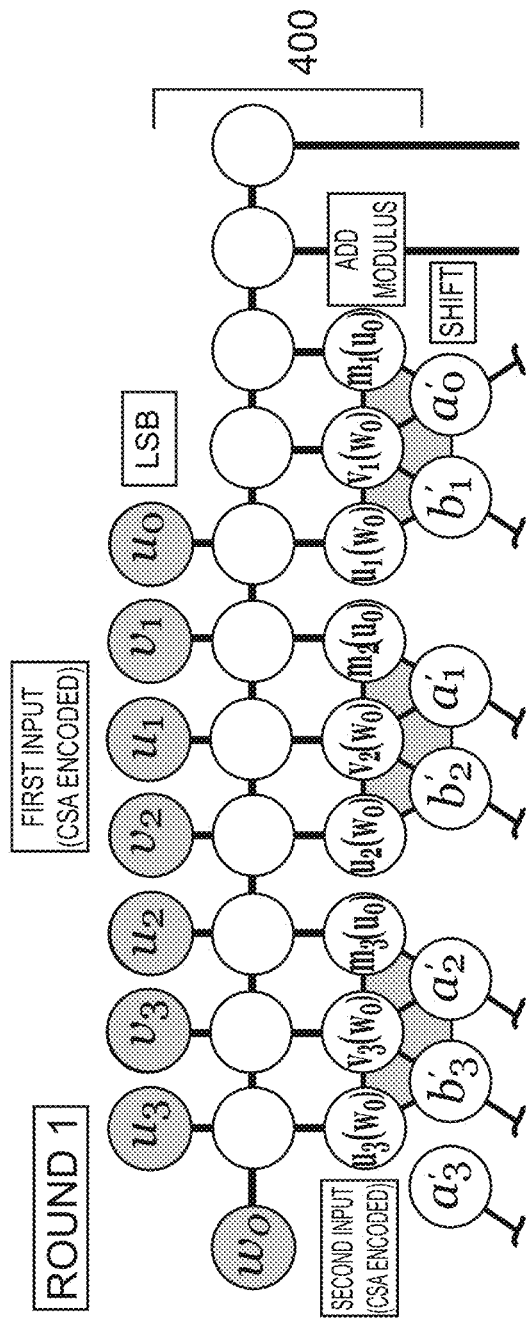
Figure 11C:
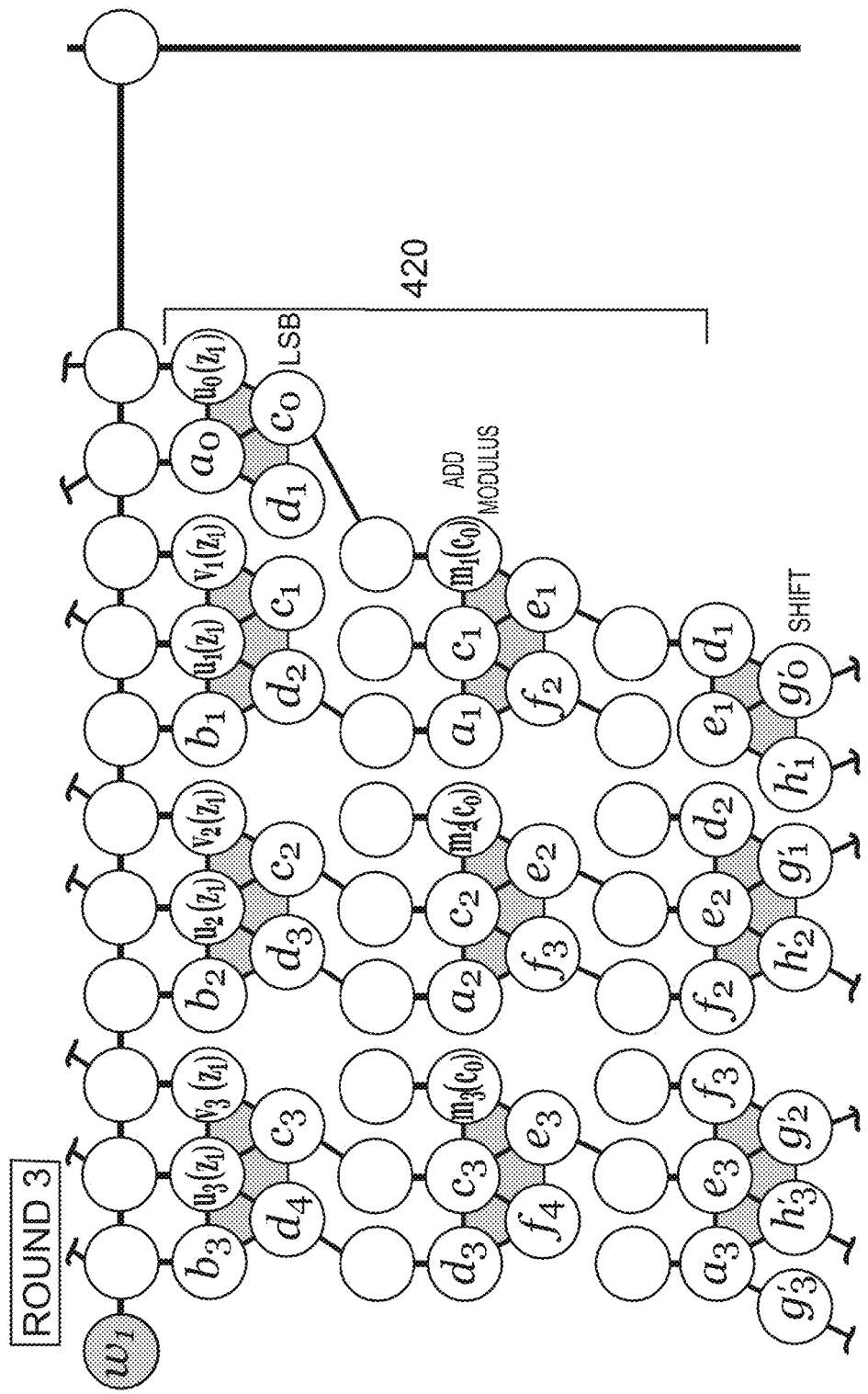
Figure 11D:
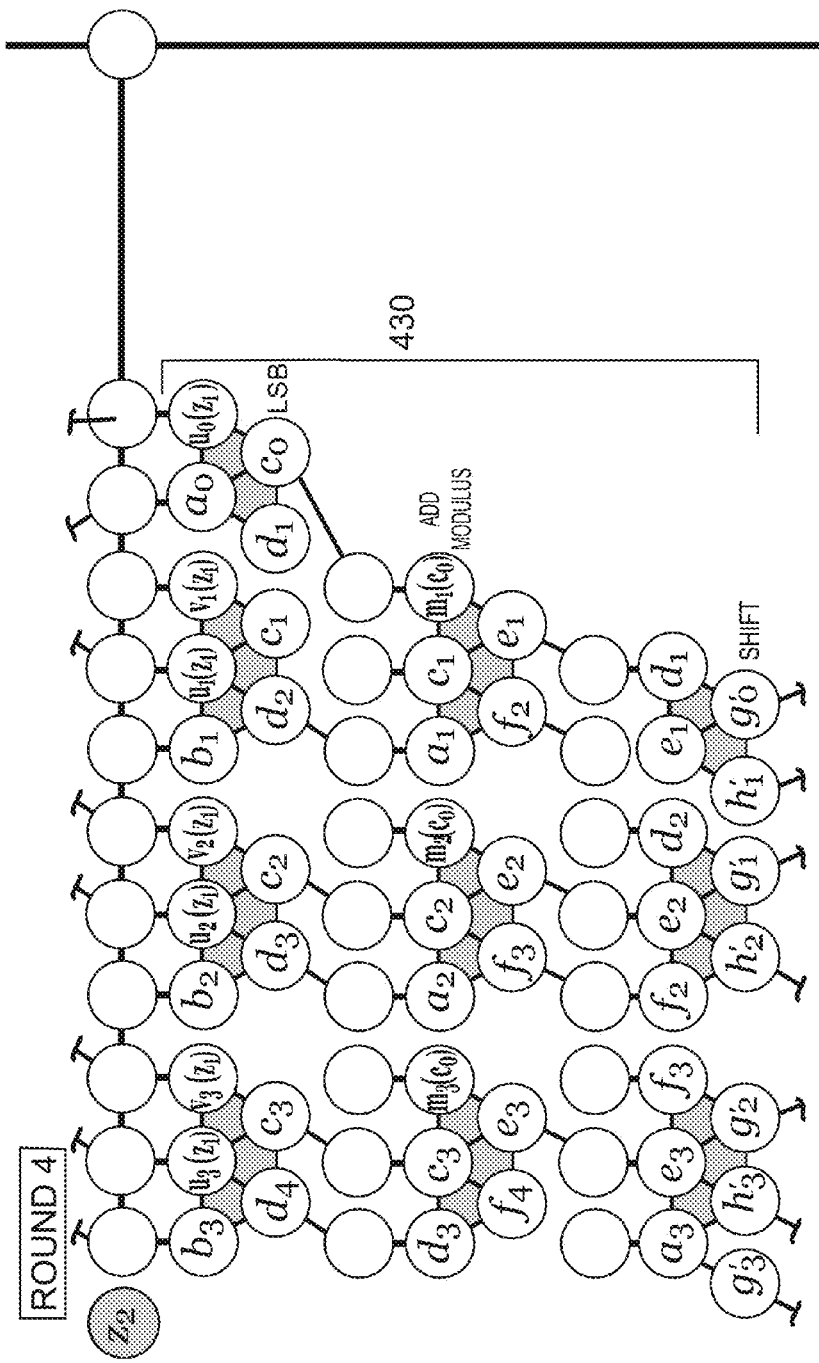
Figure 11E:
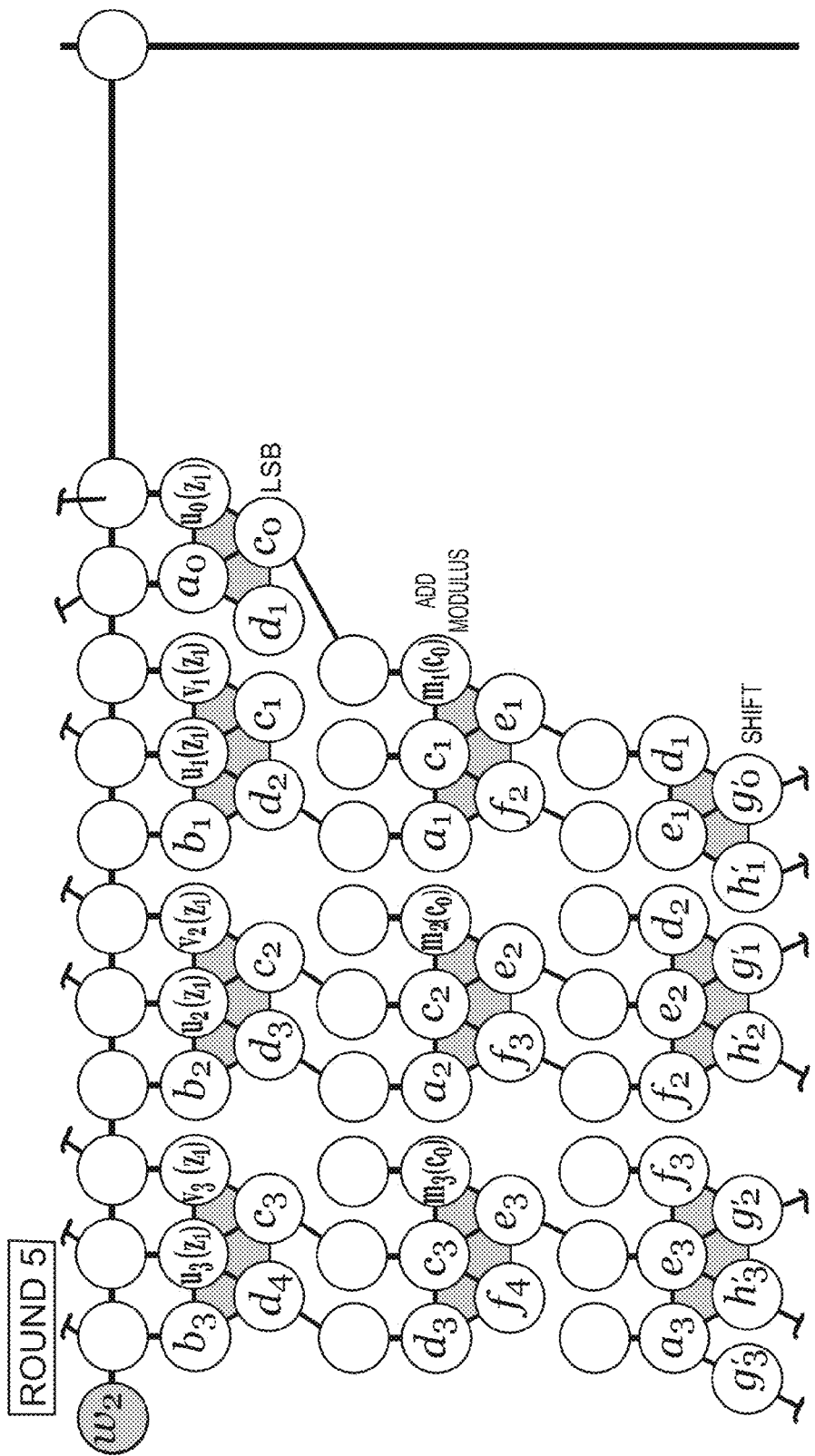
Figure 11F:
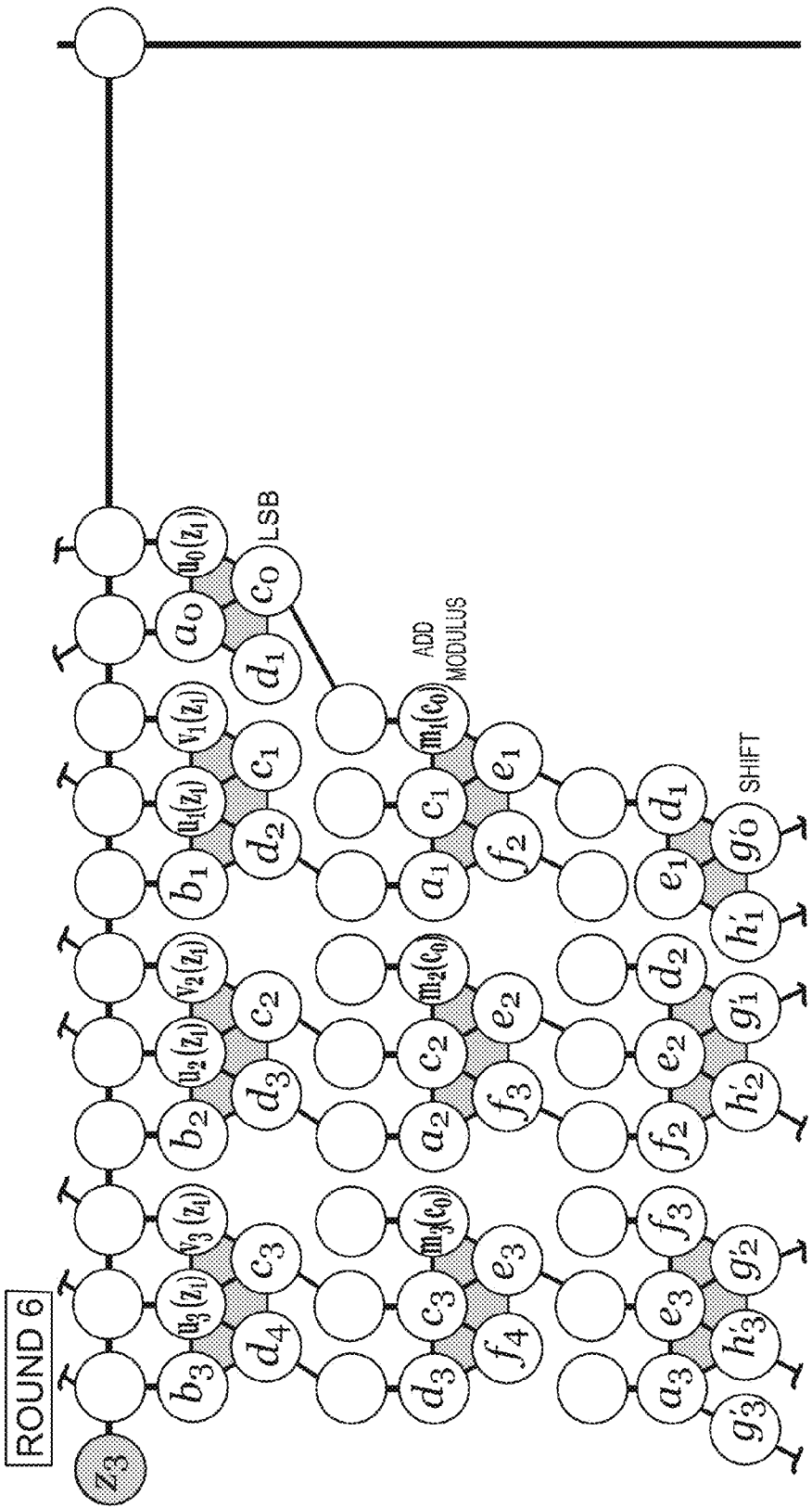
Figure 11G:
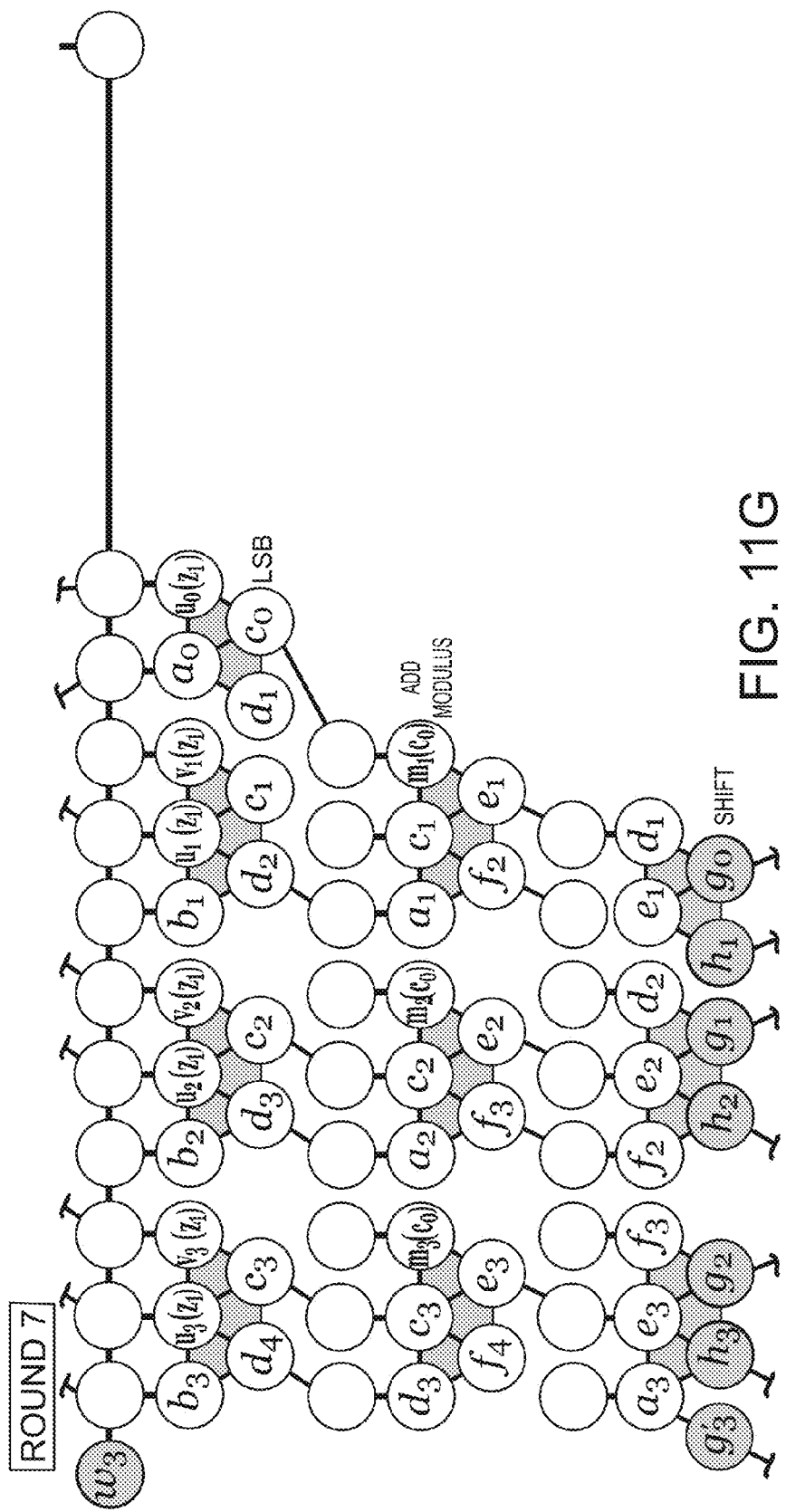

FIG. 10 depicts an example embodiment of a modular multiplier performing a second round of Montgomery modular multiplication. In FIG. 10 depicts the procedures described above in a Montgomery round, given a current running sum of 7 bits. When the bits of x controlled on the second bit of y are added it may be denoted $z_1$.

As shown in at 410 in FIG. 10, the bits $a_0$ and $u_0(z_1)$ may be added together in a another way. Since there may not be three bits of the same significance to do normal carry-save addition (which may be referred to as a three-two operation), the bits may be re-encode as a high-order bit $d_1$, which may be the logical AND of the two input bits, and a low-order bit $c_0$ which may be the parity of the two input bits. This re-encoding operation may be referred to as a two-two operation.

Controlled on the LSB $c_0$ at 411, add all but the lowest bit of the modulus m. Bits may be arbitrarily chosen from the running sum $\{d_3, c_3, a_2, c_2, a_1, c_1\}$ and the new modulus bits $\{m_3(c_0), m_2(c_0), m_1(c_0)\}$ to produce the new numbers f and e. The bit $m_0(c_0)$ may not be added to $c_0$ since that may be 0. Thus, the running sum may have the following bits: $\{f_4, e_3, f_3, e_2, f_2, e_1, d_4, d_2, d_1, a_3\}$ The remaining bits of the running sum may be added down, except for $d_4$ and $f_4$, which may be kept around to control the addition of modular residues in the next two steps, shown at 420 and 430 with respect to FIG. 11A-G.

FIG. 11A-G depicts an example embodiment of a modular multiplier performing seven rounds of Montgomery modular multiplication. FIG. 11 depicts 7 rounds of Montgomery multiplication for a disclosed embodiment using an example of L=4. The remaining rounds 3-7 use the remaining bits of y, namely $\{w_1, z_2, w_2, z_3, w_3\}$. The architecture may curve to the left since the LSB is truncated in each round and the high-order bits are kept.

As shown at 412 in FIGS. 11A-G, the new numbers g and h may be produced, whose bits may be shifted down in significance, which may be denoted shifted numbers as g' and h'. That is, the following relabeling may happen in this step: $g_1 \to g'_0$, $g_2 \to g'_1$, $g_3 \to g'_2$, $g_4 \to g'_3$, $h_1 \to h'_0$, $h_2 \to h'_1$, $h_3 \to h'_2$, $h_4 \to h'_3$. This may produce 7 bits, the same as at the beginning of the round.

Modular reduction may be applied controlled on bit $d_4$, using the same procedure as described with respect to FIGS. 5-8.

Modular reduction may be applied again controlled on bit $f_4$, using the same procedure as described with respect to FIGS. 5-8.

The above procedures may produce 7 final bits, which may be fed into the input of the next round.

FIGS. 12-21 depict an example embodiment of non-modular multiplication using constant-depth carry-save adder. In the following description of the embodiments, it is assumed that the reader is already familiar with Gossett's 3-2 carry-save adder (CSA), and carry-save encoding in which a conventional L-bit number may be represented as a (non-unique) sum of two L-bit numbers, usually denoted as u and v. In the embodiments disclosed herein, a conventional L-bit number may be generally represented with 2L-1 bits in CSA encoding, ($u_0$ through $u_{L-1}$, and $v_1$ through $v_{L-1}$).

In one example embodiment, non-modular multiplication, or just regular multiplication, may be used for a quantum algorithm. For example, given two input quantum numbers x and y, each in conventional encoding with n bits each, $\{x_i\}$ and $\{y_i\}$:

$$x = \sum_{i=0}^{n-1} x_i 2^i$$

$$y = \sum_{i=0}^{n-1} y_i 2^i$$

It may be convenient to use the convention that bit $x_i$ has significance $2^i$.

It may be desirable to compute the output $z = x \times y$, which in conventional representation has 2n-1 bits. This may be in contrast to modular multiplication, in which modular residues may be added back in, higher-order bits may be truncated, and the lowest n bits may be retained. Furthermore, in this case, the output may be allowed to be in carry-save encoding, in which case it may have up to 4n-3 bits. One example embodiment, this procedure may be done in linear depth.

The embodiments disclosed herein for non-modular multiplication may have two phases: generating partial product bits, and then adding them together.

In generating partial product bits, there may be possible $n^2$ pairs of input bits, the so-called partial products. For n=4, the following 16 bits may occur:

$$(x_3 x_2 x_1 x_0) \times (y_3 y_2 y_1 y_0) =$$

$$\begin{array}{ccccccccc}
& & & & x_3 \cdot y_0 & x_2 \cdot y_0 & x_1 \cdot y_0 & x_0 \cdot y_0 \\
& & & x_3 \cdot y_1 & x_2 \cdot y_1 & x_1 \cdot y_1 & x_0 \cdot y_1 & \\
& & x_3 \cdot y_2 & x_2 \cdot y_2 & x_1 \cdot y_2 & x_0 \cdot y_2 & & \\
+ & x_3 \cdot y_3 & x_2 \cdot y_3 & x_1 \cdot y_3 & x_0 \cdot y_3 & & & \\
\hline
z_7 & z_6 & z_5 & z_4 & z_3 & z_2 & z_1 & z_0
\end{array}$$

Each partial product bit $x_i \cdot y_j$ may have a significance $2^{i+j}$. This gives a binomial distribution where there are $$\binom{n}{k}$$

partial product pits or significance $2^k$, with the most bits (n of them) with significance $2^{n-1}$. Bits of the same significance may be referred to as a cohort.

The quantum circuit for generating these partial product bits may be done by creating entangled copies of each $x_i$ and $y_i$ in a fan out, and then apply a sequence of CNOTS.

In FIGS. 12-21 demonstrate adding down $n^2$ partial product bits down to a single carry-save encoded number. This may be unrelated to the previous example where n=4. To fully illustrate this phase of the procedure, the cohort of bits with significance $2^8$ may be considered, which may simply be labeled as 8. Bits of higher significance may be similarly labeled as 9, 10, 11, and 12. Additionally, the cohort may have 54 bits. A similar procedure may occur to the left of the current diagram on a cohort of 7 bits, and to the right of the current diagram on a cohort of 9 bits, if FIGS. 12-21 depicted all cohorts.

FIGS. 12-21 illustrate a circular layout, where the input bits begin on the outermost edge of the circle at 500, and operations occur over time on adjacent concentric circular tracks moving towards the center of the circle. To lay out these qubits using an actual fabrication process, the physical distance between two qubits from input to output may scale linearly with the size of inputs. Rather than drawing intermediate qubits, arbitrarily long interaction lengths may be assumed, which may be possible with the previously-mentioned constant-depth teleportation.

This adding down phase of non-modular multiplication may be irregular and may apply the following heuristics at the innermost track of the circle, starting with the input bits at the outermost track:

1. If there are three adjacent bits of the same significance, add them all in parallel in a single layer of carry-save addition. This may take constant depth.
2. If a track has of bits of alternating significances that are one apart (for example: i+1, i, i+1, i, i+1, i, . . . ), add an ancilla qubit connecting an adjacent pair i+1 and i. For a given triplet of (i+1, i), (i+1, i), (i+1, i), first shuffle (i+1)'s into the ancilla and perform a layer of parallel carry-save additions on the triplets of ancillae. Then swap out i+1 for the corresponding i, and perform another layer of parallel carry-save additions. This heuristic may usually be applied at the very beginning, after an initial layer of carry-save additions on a cohort; see FIG. 14 for an illustration. This heuristic takes constant depth.

3. Otherwise, the track may have mostly unsorted bits, and it may be necessary to shuffle them around the track so that the maximum number of triplets may be formed. This may be the most resource-intensive heuristic, and may make up the majority of circuit depth for the adding-down procedure. This depth may be linear.

Shuffling bits around a track to "consolidate" them into triplets for adding may be the most resource-intensive part. A bound may be calculated for the circuit depth of that heuristic.

Consider that after every layer of carry-save addition, ⅔ of the bits previously present may be left. In the worst case, it may be necessary to shuffle a bit from one end of the track all the way to the opposite end. The depth of all swap gates needed to shuffle bits in the tracks of the largest cohort, the ones with significance n−1 and n bits to start with, may need to be calculated since adding down this cohort may have the largest depth and subsume any other depths of the other cohorts.

This may take $$\frac{2}{3}n$$

swaps after the first layer of addition, $(⅔)^2 n$ swaps after the second layer of addition, and so forth all the way down to a number of bits in the end, $\log_{3/2} n$ in the worst case. However, in actuality, the process may stop much earlier, around $2 \log_{3/2} n$. This may produce the following geometric sum for the total depth:

$$\frac{2}{3}n + \left(\frac{2}{3}\right)^2 n + \left(\frac{2}{3}\right)^3 n + \ldots + \left(\frac{2}{3}\right)^{\log_{3/2} n} = \sum_{i=1}^{\log_{3/2} n} \left(\frac{2}{3}\right)^i n = \frac{2}{3}n - 2$$

The largest cohort (and presumably all the other cohorts) may be added down as far as they will go. It may be necessary to combine them all using the a shuffling heuristic. To compute the depth of this final step, the reduced number at the end of every cohort may be summed up as follows:

$$1 + 2 + \ldots + \log_{\frac{3}{2}} n = \frac{\log_{\frac{3}{2}} n \left(\log_{\frac{3}{2}} n + 1\right)}{2} = O\left(\log_{\frac{3}{2}}^2 n\right)$$

Shuffling and adding down this polylogarithmic number of qubits may also be poly logarithmic.

Therefore, the depth of the entire adding down procedure may be linear, plus lower-order logarithmic factors for the constant-depth additions and other heuristics.

Figure 12:
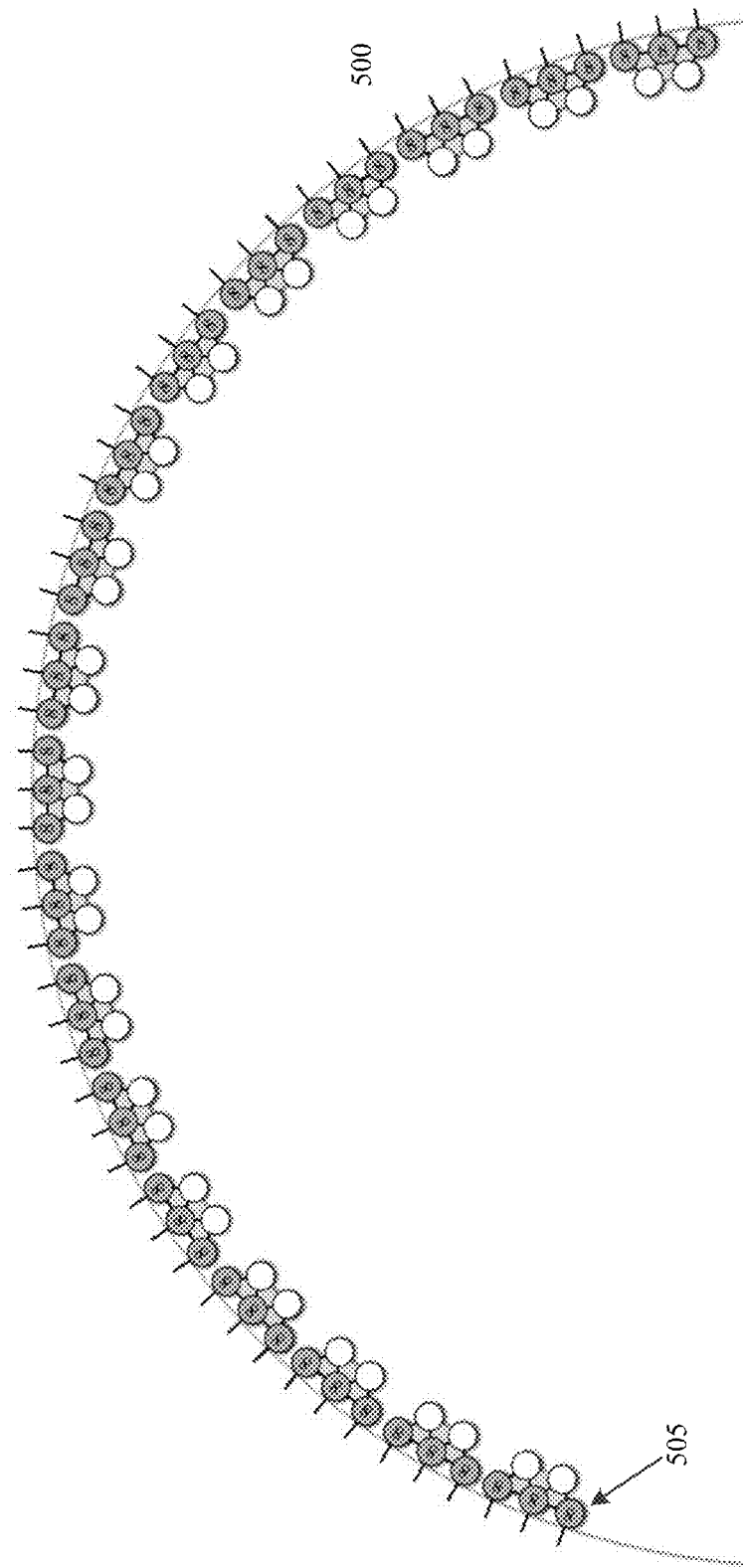
FIG. 12 depicts a first round of a non-modular multiplication using constant-depth carry-save adder.

FIG. 12 depicts a first round of an example embodiment non-modular multiplication using constant-depth carry-save adder. FIG. 12 may begin with a cohort of 54 input bits, labeled 8, such as the input bit shown at 505.

Figure 13:
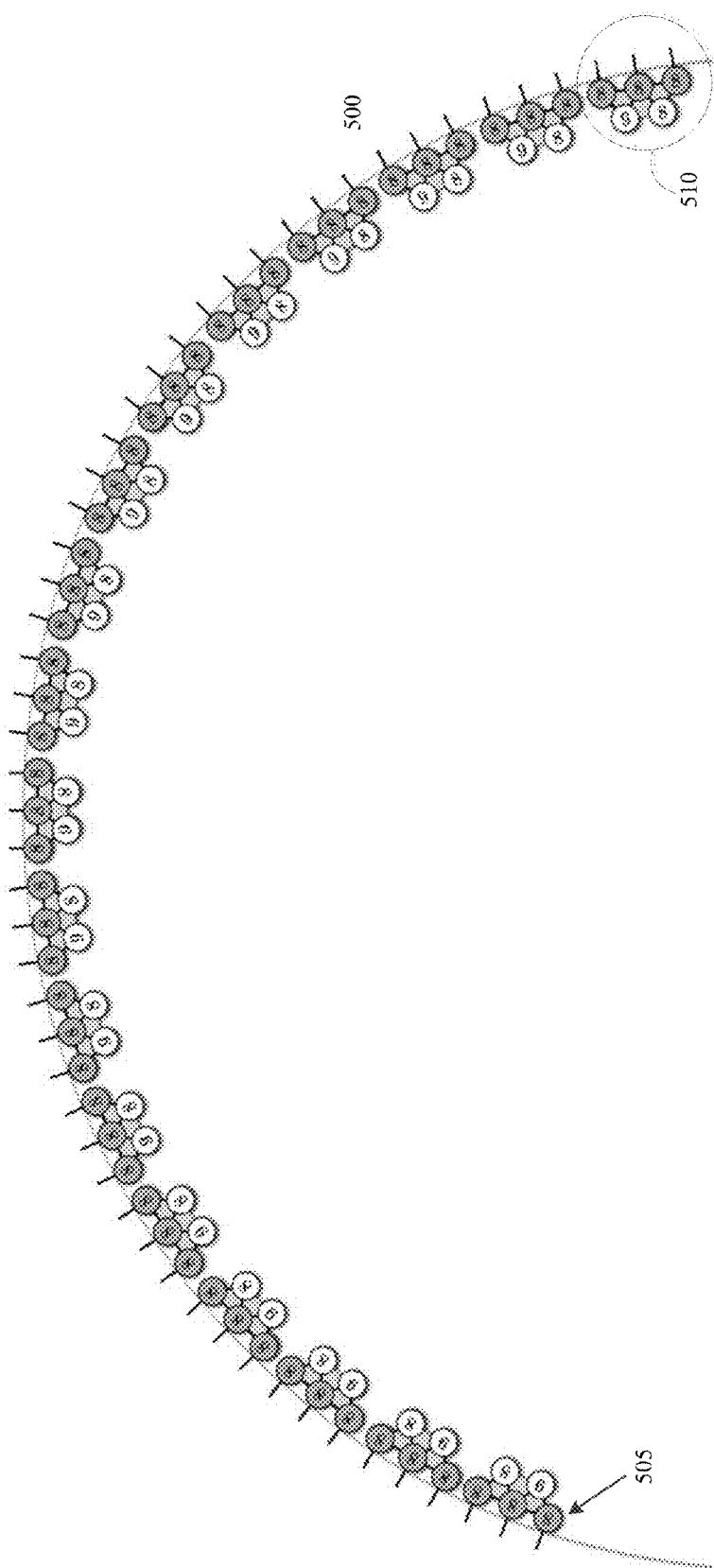
FIG. 13 depicts a second round of a non-modular multiplication using constant-depth carry-save adder.

FIG. 13 depicts a second round of an example embodiment non-modular multiplication using constant-depth carry-save adder. In FIG. 13, one round of carry-save addition may be performed. For example, as shown at 510, each triple of 8s may produce a 9 and an 8.

Figure 14:
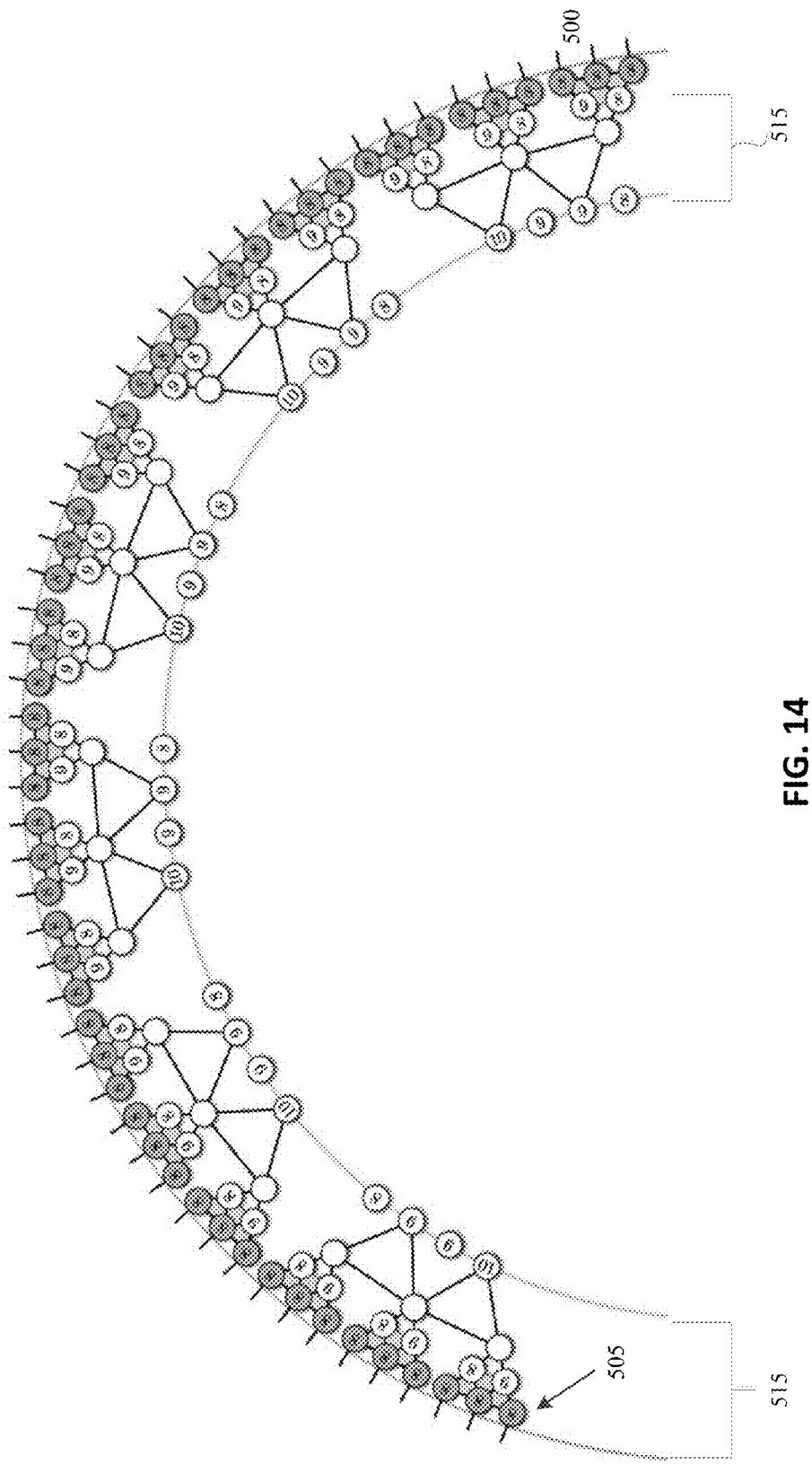
FIG. 14 depicts a third round of a non-modular multiplication using constant-depth carry-save adder.

FIG. 14 depicts a third round of an example embodiment non-modular multiplication using constant-depth carry-save adder, in which triplets of 8's and triples of 9's may be alternately added. In FIG. 14, at 515 the input 8s may be shuffled down to the empty ancillae for each triplet and one layer of carry-save addition may be performed to get an output 9 and an 8. Additionally, at 515, the output 9s and 8s may be moved to the right, and the input 8s may be swapped with the input 9s. A second layer of carry-save addition may be performed at 515 to get an output 10 and 9.

Figure 15:
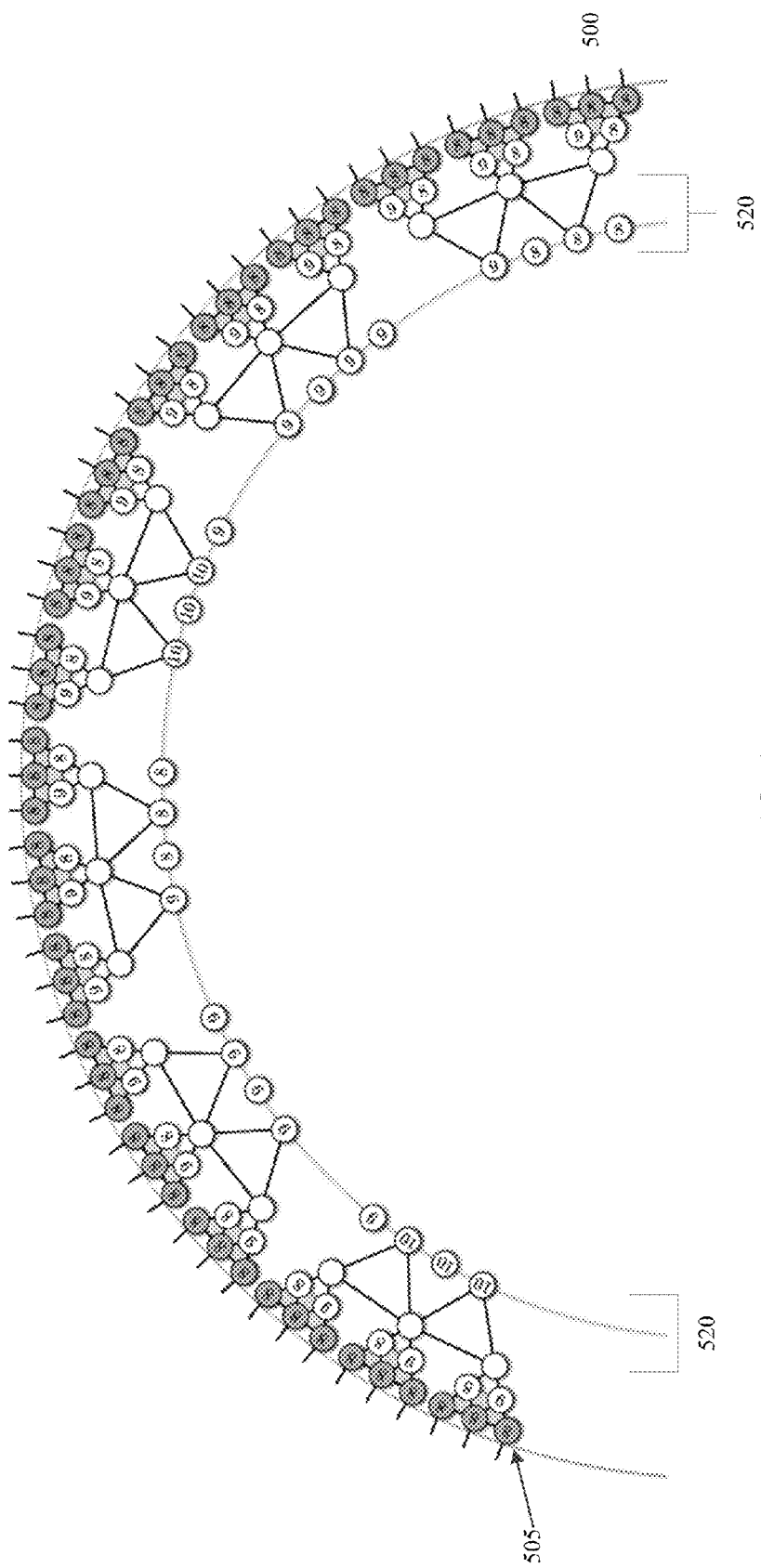
FIG. 15 depicts a third round of a non-modular multiplication using constant-depth carry-save adder.

FIG. 15 depicts a third round of an example embodiment non-modular multiplication using constant-depth carry-save adder, in which 10s, 9s, and 8s are shuffled into triplets. In FIG. 15, at 520 the qubits may be shuffled around on the innermost circle so far, for example, to consolidating enough 10s, 9s, and 8s into triples so that another layer of carry-save additions may be performed in the next round.

Figure 16:
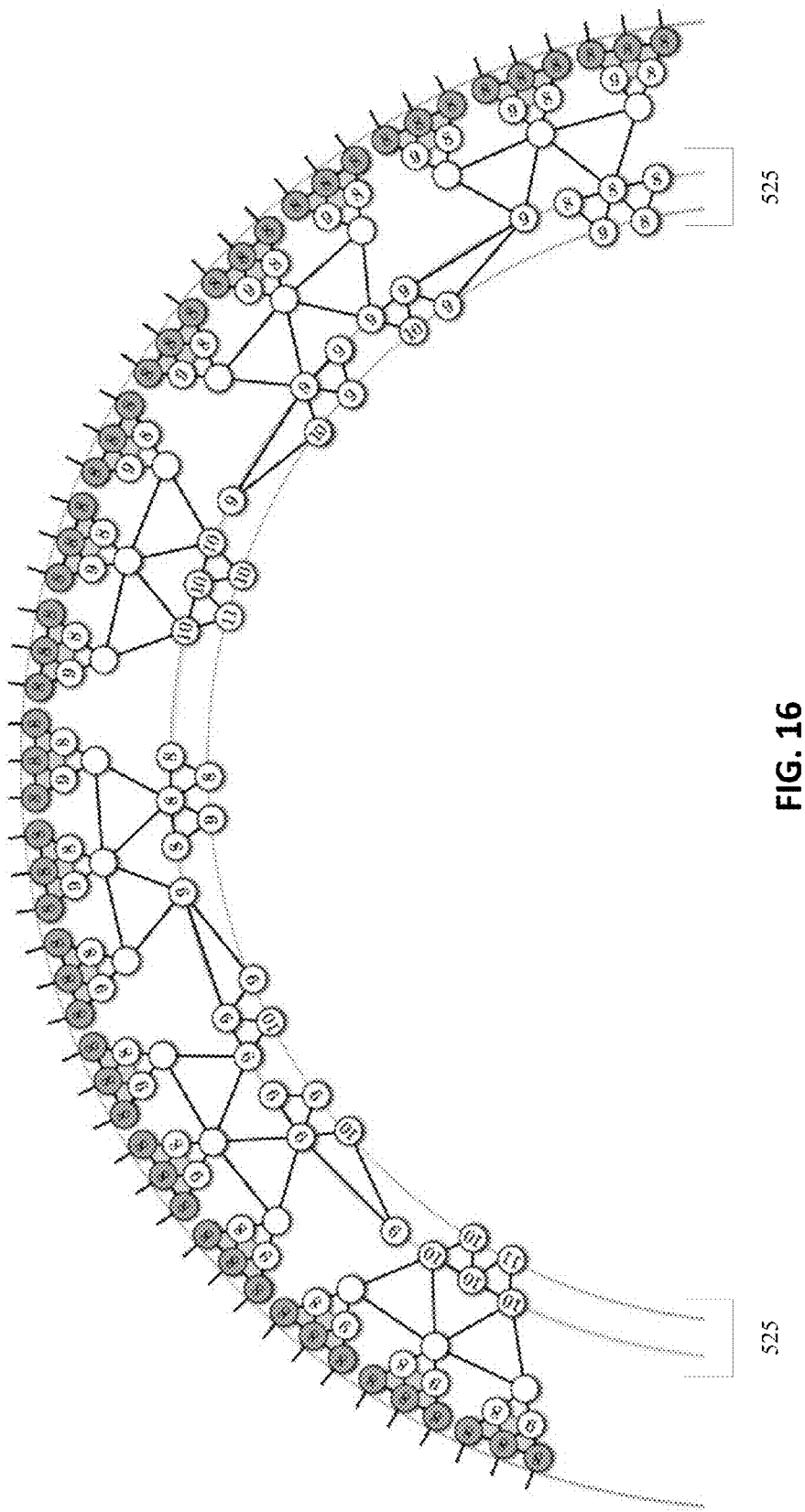
FIG. 16 depicts a fourth round of a non-modular multiplication using constant-depth carry-save adder.

FIG. 16 depicts a fourth round of an example embodiment non-modular multiplication using constant-depth carry-save adder, in which another layer of carry-saved addition may be performed. In FIG. 16, at 520 an another layer of carry-save addition may be performed to get 11s, 10s, 9s, and 8s.

Figure 17:
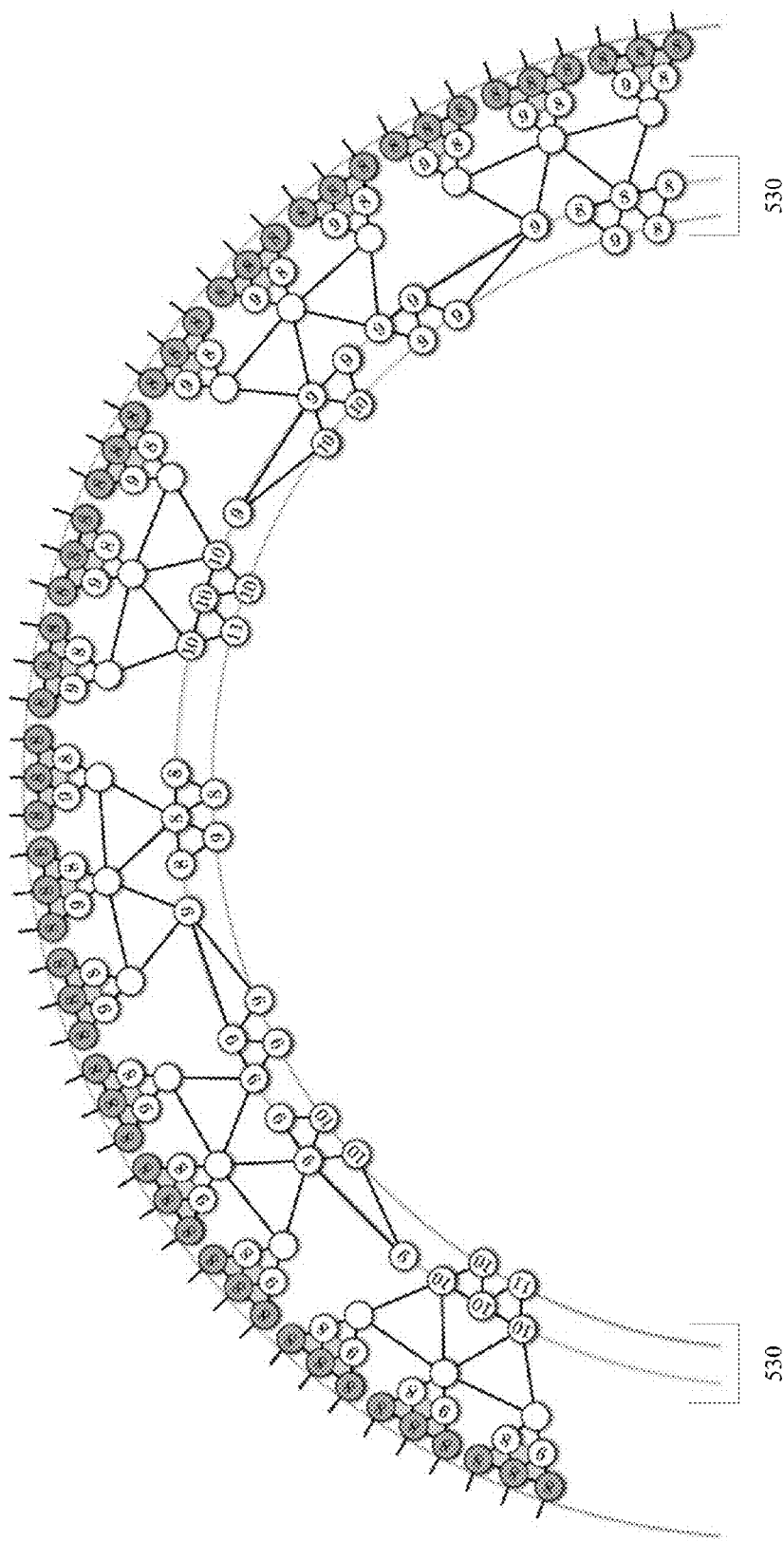
FIG. 17 depicts a fourth round of a non-modular multiplication using constant-depth carry-save adder.

FIG. 17 depicts a fourth round of an example embodiment non-modular multiplication using constant-depth carry-save adder, in which 11s 10s, 9s, and 8s may be shuffled into triplets. In FIG. 17, at 530 the qubits may be shuffled around on the innermost circle so far to consolidate triplets for the next round.

Figure 18:
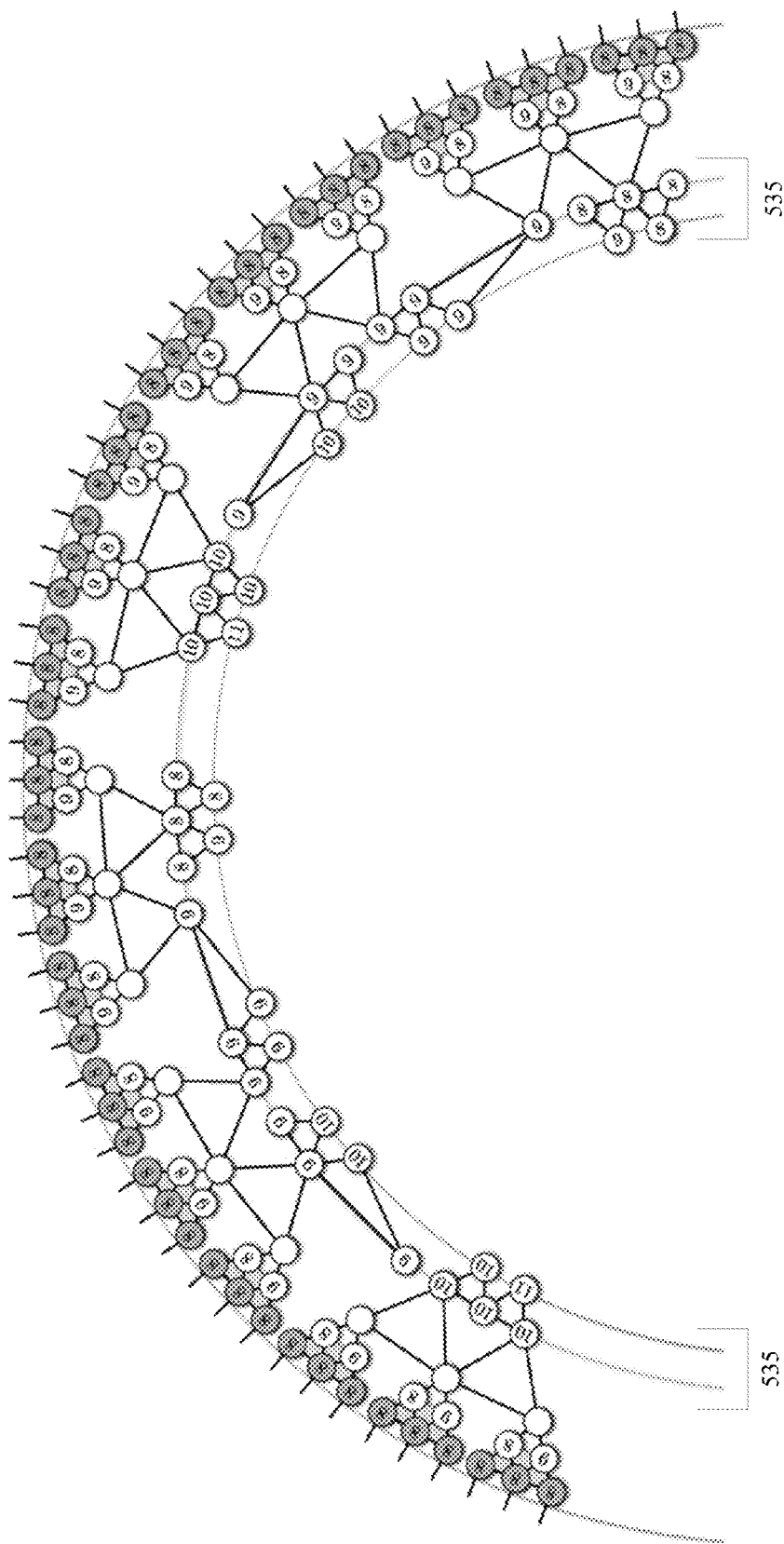
FIG. 18 depicts a fifth round of a non-modular multiplication using constant-depth carry-save adder.

FIG. 18 depicts a fifth round of an example embodiment non-modular multiplication using constant-depth carry-save adder, in which another layer of carry-save addition may be performed at 535.

Figure 19:
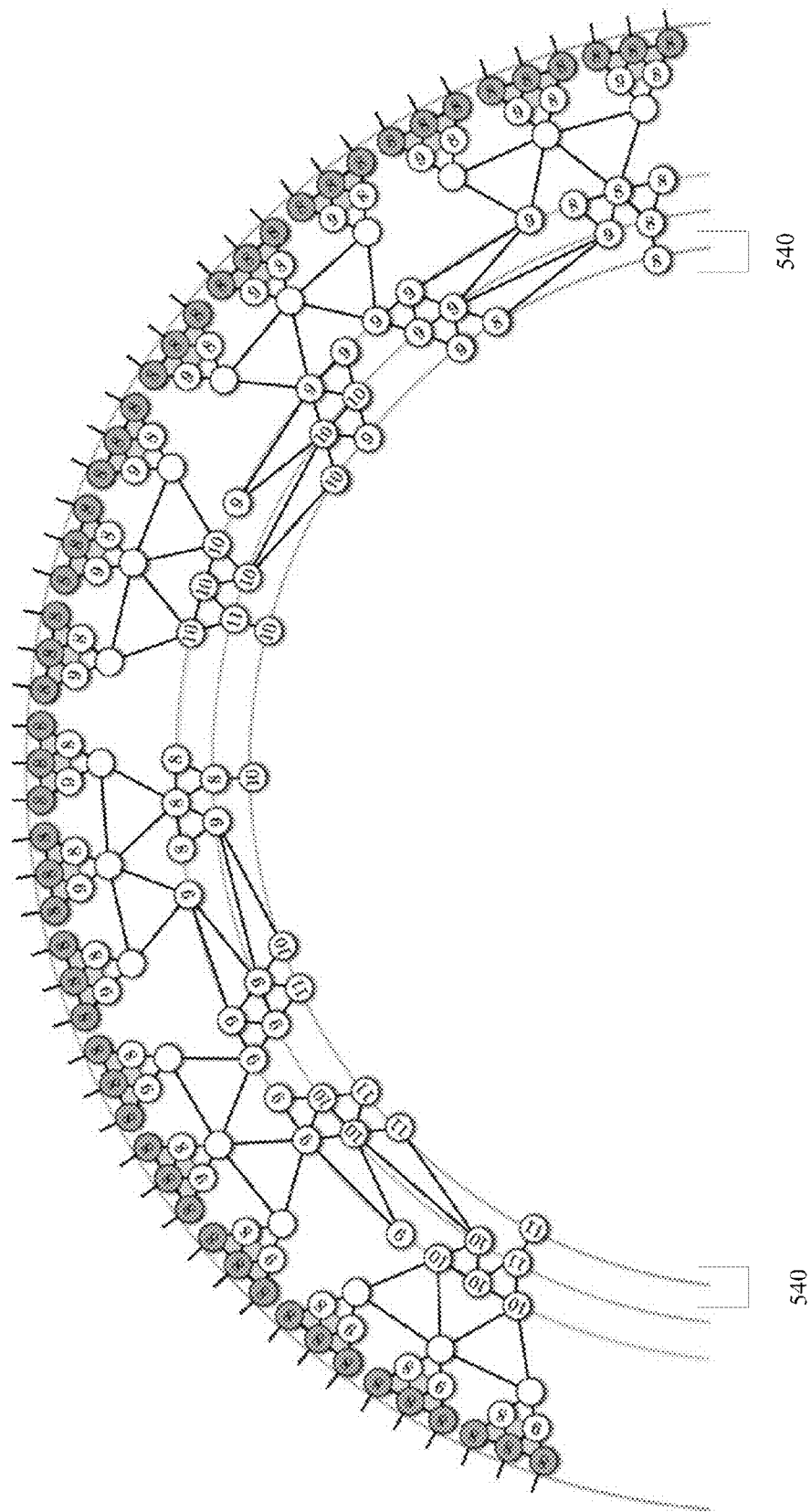
FIG. 19 depicts a fifth round of a non-modular multiplication using constant-depth carry-save adder.

FIG. 19 depicts a fifth round of an example embodiment non-modular multiplication using constant-depth carry-save adder, in which qubits may be shuffled on the innermost circle at 540 to consolidate triplets.

Figure 20:
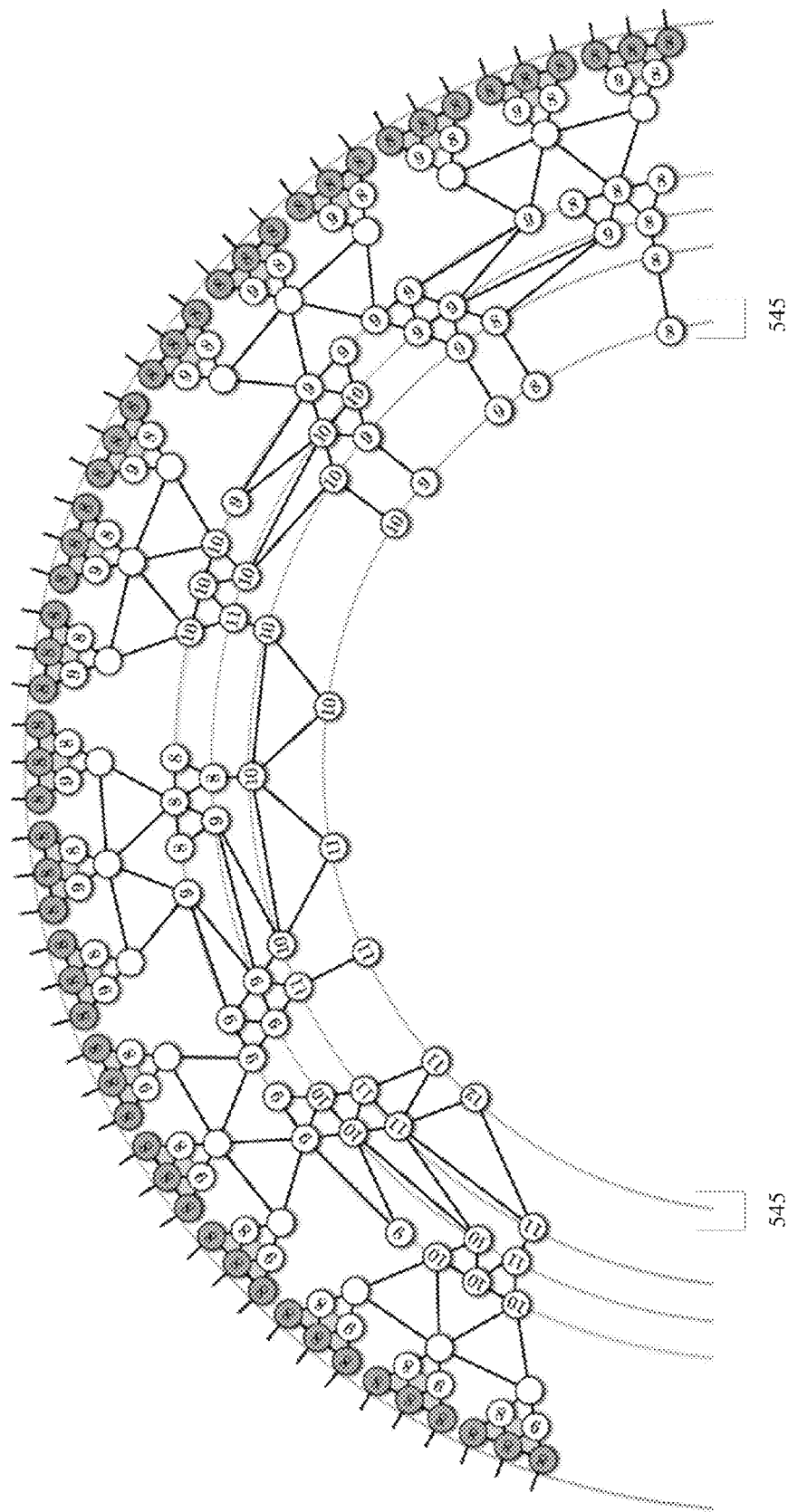
FIG. 20 depicts a sixth round of a non-modular multiplication using constant-depth carry-save adder.

FIG. 20 depicts a sixth round of an example embodiment non-modular multiplication using constant-depth carry-save adder, in which another layer of carry-save addition may be performed at 545.

Figure 21:
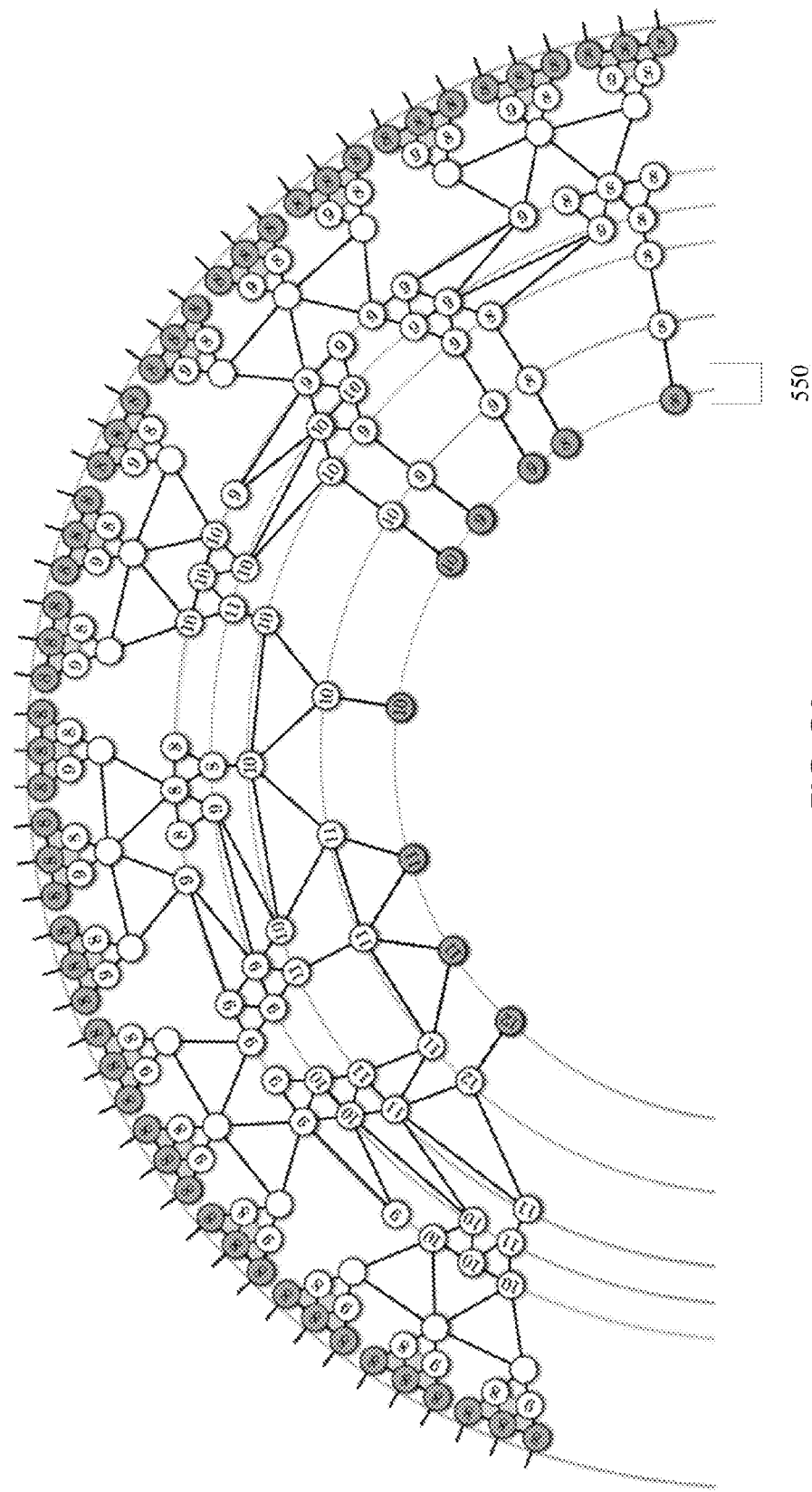
FIG. 21 depicts a sixth round of a non-modular multiplication using constant-depth carry-save adder.

FIG. 21 depicts a sixth round of an example embodiment non-modular multiplication using constant-depth carry-save adder, in which a layer of carry-save addition on the innermost circle may be performed to produce the result.

A single number in carry-save encoding may remain. For example, two bits at each significance may remain. Although this embodiment was explained with regard for cohort of 8s, this embodiment may easily be expanded to combine with the cohort of 7s to the left and the cohort of 9s to the right.

In one example embodiment, phase estimation may be parallelized. The traditional approach to quantum period finding has been to perform controlled modular-exponentiation on t=n+O(log 1/ε) control bits, which may serve as measurement instruments for the target register of L bits. This may be followed by an inverse QFT on those t bits. Here n may be the precision which to know the phase φ, that is $|\tilde{\phi}-\phi|<2^{-n}$ and ε may be the error probability in each round of QPF. This may be referred to as QFT-QPF. Note that even when approximating the QFT by cutting off two-qubit $\pi/2^k$ rotations beyond k=O(log t), its depth may be O(t log t). This depth may be for AC, and when adapted to 1D NTC it may not become much worse.

Another phase estimation approach is described by Kitaev, Shen, and Vyalyi and offers a semi-classical approach which offloads a lot of post-processing (counting, inverse trigonometric operations, and finding a continued fractions representation) to a classical computer after measurement, since classical operations are much cheaper than quantum operations (the so called "quantum coprocessor model"). Doing this may eliminate the need to do an inverse QFT. This may be referred to as KSV-QPF. It may show may be asymptotically more efficient than QFT-QPF.

The choice of QPF procedures may not be entirely independent of a MODEXP algorithm. In particular, the individual rounds of multiplication in MODEXP may be parallelized depending on how the method to measure their control qubits is selected. Therefore, the QPF procedure may be designed as a whole system to achieve optimal performance, although improvements in building blocks such as modular arithmetic may be likely to benefit the system as a whole.

For any approach to QPF, the continued fractions algorithm may require precision proportional to the size of the number to factor, specifically n=2L+2.

In one example embodiment, QPF, such as QPF 110 as shown with respect to FIG. 1, may be performed using KSV phase estimation.

On example embodiment may implement KSV phase estimation as described below. As described below "(Classical)" procedures may occur after projective measurement. Therefore, resources needed to do the first step and the second step quantumly may be counted; everything else may be consider classical post-processing. This leaves may leave t garbage qubits, which may need to be reset before running KSV-QPF again. But, this may be true even for QFT-QFP. It may also be possible to do so-called "coherent measurements," perform these post-processing steps quantumly, and then reverse them later to recover the t ancillae.

KSV Quantum Period-Finding:
1. (Quantum) Determine the values $\cos(2^j\pi\phi)$ and sin $(2^j\pi\phi)$, for $j\in\{0, 1, \ldots, 2n-1\}$ to some modest precision $\delta"$. This may involve 4n series of measurements, each one requiring a control qubit. The outcome of each control qubits may be treated as a Bernoulli trial, and each series contains s trials. This produce a total of t=4ns control qubits.
2. (Measure) Each control qubit represents the outcome of a Bernoulli trial. Each series of s control qubits may encode an estimate of a particular $2^j\phi$ value in the bias of the Bernoulli "coin."
3. (Classical) For each of the 4n estimates for $\cos(2^j\pi\phi)$ and $\sin(2^j\pi\phi)$, calculate the corresponding 2n estimates for the values $2^j\phi$ with precision $\delta'$.
4. (Classical) Use the estimates of $2^j\phi$ to create an exponentially sharp estimate of $\phi$ with precision $1/2^{2L+2}$.
5. (Classical) Do the continued fractions algorithm on the phase $\phi$ to get a denominator. This is the output of QPF with some error probability $\epsilon$.

The following paragraphs define the parameters used above. The modest precision $\delta'$ that the power-of-two phase multiples $2^j\phi$ may be $1/16$ in Kitaev's original analysis and may be as low as $\frac{1}{2}$. KSV-style phase sharpening may also be possible with $\frac{1}{4}$. This determines the precision $\delta"$ to know the cosines and sines of $2^j\phi$ and may be related by $$\delta" = \frac{1+\cos(\pi-\delta)}{2}$$

The number of trials s depends on $\delta'$, and the error probability $\epsilon$ as follows:

$$s = \frac{1}{2\delta"^2}\log\left(\frac{1}{\epsilon}\right)$$

To minimize the number of control qubits t=4 ns, and therefore s, which corresponds to maximizing $\delta"$. Table 3 gives some examples of achievable parameters:

TABLE 3

| KSV-QPF parameters for $\epsilon$ = 1/4 and L = 4096 | | | | | |
|---|---|---|---|---|---|
| $\delta'$ | $\delta"$ | $\frac{1}{2\delta"^2}$ | s | t | t' |
| 1/16 | 0.031230 | 512.67 | 710 | 23,270,960 | 8,206 |
| 1/8 | 0.062337 | 128.67 | 179 | 5,866,904 | 8,204 |
| 1/4 | 0.12370 | 32.68 | 45 | 1,507,696 | 8,202 |
| 1/2 | 0.47943 | 2.18 | 3 | 98,328 | 8,198 |

In KSV-QPF, phase estimation may be parallelized by grouping the t control bits into 4 s groups of n-bits each, and then adding them together into an t'=(n+log(4 s))-bit final number, which may then serves as the control bits for modular exponentiation. For QFT-QPF, t'=t.

Control qubits may be used in a semi-classical way by resetting them after measurement according to the outcome. This approach may be due to Beauregard, who gives an explicit circuit for reusing a single control qubit for all measurements. Beauregard's approach may implement the QFT at the same time as reusing a single control qubit for all measurements, using only single-qubit rotations dependent on previous measurement outcomes. Moreover, all these single-qubit rotations may be combined into a single single-qubit rotation, since it is dependent on previously-known outcomes. This may remove the need for a separate inverse QFT step in QFT-QPF, but may also require all the multiplications to happen in series, since they may depend on the reusable control qubit that may be measured, reset, and rotated. Therefore, the KSV-QPF approach may distinguish itself from the parallel multiplication of numbers to achieve MODEXP in lower depth.

A number of resources may be needed to perform each kind of QPF procedure. For QFT-QPF, MODEXP may be called once per t control bits according to the following equation. For L=4096; t=8196.

$$t = n + \left\lceil \log\left(2 + \frac{1}{2\epsilon}\right)\right\rceil = (2L+2) + \log 4 = 2L + 4$$

QFT-QPF may call an inverse QFT, which may be approximate. The QFT implemented on LNN by Kutin has depth 2t-3 and size t(t-1)/2. However, this may be nested with adjacent operations due to the triangular shape of the QFT.

KSV-QFT may start out with t=4ns control qubits, each of which may control a separate run of MODEXP. This may be parallelized by performing the addition of 4s(2 L+2)-bit numbers. Using the disclosed carry-save adder, this may take 18 $\log_{3/2}(4\text{ s})$ depth, $4L^2-3L$ ancillae, and $18L^2-62L+36$ size. The smallest conjectured value of s may be 3.

Table 4, shown below, shows a comparison of asymptotic resource usage for quantum period-finding implementation including the embodiments disclosed herein. In Table 4, $\epsilon=\frac{1}{4}$ and $\delta'=\frac{1}{2}$ for KSV-QPF. The number of measurements may be included for completeness, since these may not be counted as gates in any model but may be comparable in terms of execution time. The KSV-QPF approach disclosed herein may use a conventional modular multiplier that may reduce the final product with a division and subtraction.

Some table cells may be left blank since their authors did not calculate them, or they are not relevant for the current comparison.

As expected for this tradeoff, the embodiments disclosed herein may an achieve an exponential improvement in circuit depth (from quadratic to poly-logarithmic) with the KSV-QPF approach with a corresponding polynomial increase in circuit width (linear to cubic) and a simple log-factor increase in circuit size.

Using both a combination of algorithmic improvements (such as carry-save adders and KSV-style parallelized phase estimation) and architectural improvements (irregular two-dimensional layouts), the central part of Shor's factoring algorithm (quantum period-finding) may be run with a smaller depth than previous implementations, both asymptotically and numerically.

Additionally, the embodiments disclosed herein using quantum arithmetic on 2d architectures may provide improvements for any 2D quantum arithmetic procedures. For example, the embodiments disclosed herein may show an improvement in depth at the expense of increased width over existing nearest-neighbor implementations.

Furthermore, the new architectural model disclosed may take advantage of the new physical technology of topological qubits such as, for example, those topological qubits using 1D nanowires on a superconducting substrate. Thus, the discussion of the disclosed embodiments with regard to 2D layouts that may include cheap ancillae and negligible error correction, may also be used with regard to 1D nanowires or other layouts. Additionally, the disclosed embodiments may be used with to improve implementations on regular 2D NTC layouts as well as 1D NTC layouts.

Furthermore, the disclosed embodiments contemplate the use of FFT-based multipliers or the use of approximate multipliers. The disclosed embodiments may also be used with 7→3 circuits, 15→4 circuits, 31→4 circuits, or in general a $2^{n-2}$→n circuit. This may require reversible circuit optimization as well as numerical comparison to see the overhead of parallelizing this addition further.

What is claimed:

1. A method for performing modular addition using a constant-depth carry-save adder circuit in a two dimensional nearest-neighbor quantum architecture, the method comprising:

receiving n-bit binary numbers a, b, and c at associated adjacent qubits, wherein the n-bit binary numbers a, b, and c have respective bits $a_i$, $b_i$, and $c_i$, wherein i indicates a bit position with significance $2^i$;

performing an addition of a, b, and c by coupling the qubits associated with each of a, b, and c to corresponding nearest-neighbor qubits associated with one or more of a, b and c using n parallel carry-save adder circuits, wherein each parallel carry-save adder circuit sums corresponding bits $a_i$, $b_i$, and $c_i$ to produce bits $u_i$, and $v_i$, of output numbers u and v, respectively, by coupling $a_i$, $b_i$, and $c_i$ to two nearest-neighbor ancilla qubits associated with output numbers u and v;

truncating $v_{n-1}$, $u_{n-1}$, and $v_n$, from u and v; and distributing a modular residue $c^{v_{n-1}}$ controlled on $v_{n-1}$ to u and v to produce a first result.

2. The method of claim 1, further comprising distributing a modular residue $c^{u_{n-1}}$ controlled on $u_{n-1}$ to the first result to produce a second result.

3. The method of claim 2, further comprising distributing a modular residue $c^{v_n}$ controlled on $v_n$ to the second result to produce a third result.

4. The method of claim 3, wherein distributing a modular residue $c^{v_{n-1}}$ controlled on $v_{n-1}$ comprises:

calculating $c^{v_{n-1}}$ according to the equation $c^{v_{n-1}}=2^{n-1}$ mod m, wherein m is an n-bit modulus;

truncating $c_{n-1}^{v_{n-1}}$ from $c^{v_{n-1}}$; and combining $c_i^{v_{n-1}}$ $u_i$ and $v_i$ to produce the first result.

5. The method of claim 4, wherein distributing a modular residue $c^{u_{n-1}}$ controlled on $u_{n-1}$ comprises:

calculating $c_i^{u_{n-1}}$ according to the equation $c^{u_{n-1}}=2^{n-1}$ mod m;

truncating $c_{n-1}^{v_{n-1}}$ from $c_i^{v_{n-1}}$; and combining $c_i^{u_{n-1}}$ and $c_{n-1}^{v_{n-1}}$ to $u_i$ and $v_i$ to produce the second result.

6. The method of claim 5, wherein distributing a modular residue $c^{v_n}$ controlled on $v_n$ comprises:

calculating $c_i^{u_{n-1}}$ according to the equation $c^{u_{n-1}}=2^{n-1}$ mod m;

truncating $c_{n-1}^{v_{n-1}}$ from $c_i^{v_{n-1}}$ ; and combining $c_i^{u_{n-1}}$ and $c_{n-1}^{v_{n-1}}$ to $u_i$ and $v_i$ to produce the third result.

* * * * *